US012386053B2

(12) United States Patent
Zhu et al.

(10) Patent No.: US 12,386,053 B2
(45) Date of Patent: Aug. 12, 2025

(54) VELOCITY AMBIGUITY RESOLVING METHOD AND ECHO SIGNAL PROCESSING APPARATUS

(71) Applicant: Shenzhen Yinwang Intelligent Technologies Co., Ltd., Shenzhen (CN)

(72) Inventors: Jintai Zhu, Beijing (CN); Dejian Li, Beijing (CN); Dapeng Lao, Beijing (CN); Ben Wang, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 674 days.

(21) Appl. No.: 17/707,691

(22) Filed: Mar. 29, 2022

(65) Prior Publication Data

US 2022/0221570 A1 Jul. 14, 2022

Related U.S. Application Data

(63) Continuation of application No. PCT/CN2019/109670, filed on Sep. 30, 2019.

(51) Int. Cl.
*G01S 13/58* (2006.01)
*G01S 7/41* (2006.01)
(Continued)

(52) U.S. Cl.
CPC ............ *G01S 13/584* (2013.01); *G01S 7/415* (2013.01); *G01S 13/343* (2013.01); *G01S 13/582* (2013.01); *G01S 13/931* (2013.01)

(58) Field of Classification Search
CPC ...... G01S 13/584; G01S 7/415; G01S 13/343; G01S 13/582; G01S 13/931
(Continued)

(56) References Cited

U.S. PATENT DOCUMENTS 4,959,653 A * 9/1990 Ganz ................. G01S 7/021
342/17
9,465,103 B2 * 10/2016 Sochen ................ G01S 13/58
(Continued)

FOREIGN PATENT DOCUMENTS

CN 102156279 A 8/2011
CN 105572660 A 5/2016
(Continued)

OTHER PUBLICATIONS

Zhu Yanping "Research on several key technologies of MIMO Radar," Nanjing University of Science and Technology, Total 145 pages (Dec. 2013). With an English Abstract.
(Continued)

*Primary Examiner* — Nuzhat Pervin
(74) *Attorney, Agent, or Firm* — Leydig, Voit & Mayer, Ltd.

(57) ABSTRACT

A velocity ambiguity resolving method and an echo signal processing apparatus are provided. The method includes: calculating, for first echo signals respectively received by at least two receive antennas in the N receive antennas, a first estimate of a direction of arrival formed by the at least two receive antennas and a first target, where the first echo signals are echo signals formed after transmit signals sent by a same transmit antenna in a time division transmit mode are reflected by the first target; separately performing, by using the first estimate, angle compensation on M second echo signals received by a first receive antenna, to obtain M first compensated echo signals; and performing velocity estimation based on at least two first compensated echo signals, to obtain a velocity of the first target.

20 Claims, 11 Drawing Sheets

(51) Int. Cl.
*G01S 13/34* (2006.01)
*G01S 13/931* (2020.01)

(58) Field of Classification Search
USPC ........................................................ 342/162
See application file for complete search history.

(56) References Cited

U.S. PATENT DOCUMENTS

| | | | |
|---|---|---|---|
| 9,901,252 B2* | 2/2018 | Tran .................... A61B 8/06 |
| 9,958,541 B2* | 5/2018 | Kishigami ............. G01S 13/26 |
| 10,429,513 B2* | 10/2019 | Yun ..................... G01S 5/0036 |
| 10,473,780 B1* | 11/2019 | Brown .................... G08G 1/16 |
| 10,866,304 B1* | 12/2020 | Hassibi .................. G01S 13/26 |
| 11,047,968 B2* | 6/2021 | Lizuka .................... G01S 13/04 |
| 11,300,677 B2* | 4/2022 | Bialer .................... G01S 13/931 |
| 11,506,776 B2* | 11/2022 | Cho ..................... G01S 13/931 |
| 11,668,798 B2* | 6/2023 | Kumar .................... G06T 11/20 |
| | | | 701/408 |
| 11,789,143 B2* | 10/2023 | Shabtay ............... G01S 13/931 |
| | | | 342/378 |
| 11,828,839 B2* | 11/2023 | Choi ..................... G01S 13/003 |
| 12,000,921 B2* | 6/2024 | Kishigami ............. G01S 7/352 |
| 2003/0058159 A1* | 3/2003 | Bickert ............... G01S 13/9092 |
| | | | 342/25 R |
| 2014/0035776 A1* | 2/2014 | Sochen ................ G01S 13/582 |
| | | | 342/107 |
| 2016/0187477 A1* | 6/2016 | Wang ............... G08B 13/19617 |
| | | | 342/146 |
| 2018/0011170 A1* | 1/2018 | Rao ........................ G01S 7/354 |
| 2019/0367015 A1* | 12/2019 | Teller ..................... B60W 30/00 |
| 2020/0116850 A1* | 4/2020 | Santra .................. A61B 5/0507 |
| 2020/0158862 A1* | 5/2020 | Mahmoud ............. G01S 13/931 |
| 2020/0376927 A1* | 12/2020 | Rajaie ................ B60H 1/00764 |
| 2020/0379078 A1* | 12/2020 | Shiba .................... G01S 13/06 |
| 2020/0393540 A1* | 12/2020 | Bialer ................... G01S 7/4026 |
| 2021/0149038 A1* | 5/2021 | Yuasa .................... G01S 7/354 |
| 2021/0405183 A1* | 12/2021 | Vossiek ................ G01S 13/931 |
| 2022/0113376 A1* | 4/2022 | Zechner ............... G01S 13/931 |
| 2023/0162510 A1* | 5/2023 | Li ......................... G01S 7/4808 |
| | | | 382/103 |

FOREIGN PATENT DOCUMENTS

| | | | | |
|---|---|---|---|---|
| CN | 105629206 A | | 6/2016 | |
| CN | 106353744 A | | 1/2017 | |
| CN | 106443615 A | | 2/2017 | |
| CN | 108594233 A | * | 9/2018 | ............ G01S 13/92 |
| CN | 108802718 A | | 11/2018 | |
| CN | 109642944 A | | 4/2019 | |
| CN | 109814073 A | | 5/2019 | |
| CN | 109975806 A | | 7/2019 | |
| EP | 3792657 A1 | * | 3/2021 | ............... B60R 1/00 |
| EP | 3775992 B1 | * | 7/2023 | ........... G01C 21/025 |
| KR | 20130134843 A | | 12/2013 | |

OTHER PUBLICATIONS

Shapir et al., "Doppler Ambiguity Resolving in TDMA Automotive MIMO Radar via Digital Multiple PRF," 2018 IEEE Radar Conference (RadarConf18), pp. 0175-0180, Institute of Electrical and Electronics Engineers, New York, New York (Apr. 23-27, 2018).

Zoeke et al., "Phase Migration Effects in Moving Target Localization Using Switched MIMO Arrays," Proceedings of the 12th European Radar Conference, Paris, France, pp. 85-88, Institute of Electrical and Electronics Engineers, New York, New York (Sep. 9-11, 2015).

* cited by examiner

VELOCITY AMBIGUITY RESOLVING METHOD AND ECHO SIGNAL PROCESSING APPARATUS

CROSS-REFERENCE TO RELATED APPLICATIONS

This application is a continuation of International Application No. PCT/CN2019/109670, filed on Sep. 30, 2019, the disclosure of which is hereby incorporated by reference in its entirety.

TECHNICAL FIELD

Embodiments of this application relate to the field of radar technologies, and in particular, to a velocity ambiguity resolving method and an echo signal processing apparatus.

BACKGROUND

A vehicle-mounted radar is an important component in an automated driving system. The vehicle-mounted radar may provide a vehicle with detection of a target object such as an obstacle or a moving object, for example, may detect a distance, a velocity, and an angle of an obstacle around the vehicle.

A millimeter wave radar is one type of vehicle-mounted radar. With the development of an advanced driver assistant system (ADAS) and self-driving technologies, requirements of a longer detection range, higher range resolution, and higher angular resolution are imposed on the millimeter wave radar. Therefore, a multiple-input multiple-output (MIMO) radar becomes an important development direction of the vehicle-mounted millimeter wave radar.

In the MIMO radar, it is assumed that M transmit antennas are included, and the M transmit antennas may transmit signals in a time division multiplexing (TDM) mode. Although the MIMO radar may improve angular resolution, a maximum velocity measurement range corresponding to a TDM MIMO radar decreases to 1/M of a maximum velocity measurement range of a single-input multiple-output (SIMO) radar with a same transmitting cycle, and velocity aliasing is more likely to occur during calculation of a velocity of a target object, thereby causing velocity ambiguity.

To resolve a problem of velocity ambiguity existing in the MIMO radar, in an existing solution, the MIMO radar transmits frequency modulation signals of at least two different cycles, and then estimates a velocity of a target based on frequency modulation signals of each different cycle. Then, when velocities extended based on the frequency modulation signals of at least two different cycles match, a corresponding velocity is used as an actual velocity of the target object. In this manner, frequency modulation signals of different cycles need to be transmitted. Consequently, an entire signal transmitting cycle is increased, and an update cycle of target measurement is increased. Therefore, measurement information (such as a velocity, an angle, and a distance) of the target cannot be obtained in time. In another conventional technology, during designing of an antenna array of the MIMO radar, some virtual array positions are designed to overlap, angles of the target in an overlap array are equal, and a phase difference of the target is only a function of a velocity (Doppler frequency). Then, phase information of overlapped receiving array elements is used for velocity ambiguity resolving. However, this manner requires a plurality of overlapped elements. This sacrifices an equivalent antenna array element length of the MIMO array, and therefore reduces angular resolution of a target. In some other technologies, for example, when angle estimation of the target or coherent superposition is performed based on a received signal, a velocity is estimated in a spectrum peak search manner. However, it is difficult to find a maximum spectrum peak in actual measurement, and therefore a correct velocity solution cannot be obtained. For another example, it is assumed that both a vertical angle and a horizontal angle of a forward-looking target are close to 0 degrees, and velocity ambiguity resolving processing is performed by ignoring phase deviations between different transmit antennas caused by angles. However, in an actual scenario, a TDM MIMO transmit antenna mainly focuses on horizontal angle observation, an observation range is usually between −60 degrees and 60 degrees, and a vertical angle is usually between −15 degrees and 15 degrees. Therefore, the assumption that targets mainly gather around 0 degrees is true only in some specific scenarios. Therefore, an accurate velocity solution cannot be obtained.

In conclusion, a velocity ambiguity resolving solution is urgently needed, to accurately estimate a velocity of a target without sacrificing performance of the MIMO radar.

SUMMARY

Embodiments of this application provide a velocity ambiguity resolving method and an echo signal processing apparatus, to accurately estimate a velocity of a target without sacrificing performance of a MIMO radar.

According to a first aspect, this application provides a velocity ambiguity resolving method. The method is applied to a radar apparatus including M transmit antennas and N receive antennas, where M is an integer greater than 1, and N is an integer greater than 1. The method includes: calculating, for first echo signals respectively received by at least two receive antennas in the N receive antennas, a first estimate of a direction of arrival formed by the at least two receive antennas and a first target, where the first echo signals are echo signals formed after transmit signals sent by a same transmit antenna are reflected by the first target; separately performing, by using the first estimate, angle compensation on M second echo signals received by a first receive antenna, to obtain M first compensated echo signals, where the M second echo signals are echo signals formed after transmit signals transmitted by the M transmit antennas in a time division transmit mode are reflected by the first target, and the first receive antenna is any one of the N receive antennas; and performing velocity estimation based on at least two first compensated echo signals in the M first compensated echo signals, to obtain a velocity of the first target.

In the foregoing method, phase information of the M second echo signals received by the first receive antenna is related to an angle and a velocity, and the M second echo signals received by the first receive antenna are compensated by using the first estimate of the direction of arrival, so that a phase effect caused by the angle may be eliminated. That is, the obtained first compensated echo signals are only related to the velocity. Then, velocity estimation is performed based on the first compensated echo signals that are only related to the velocity, and an estimated maximum unambiguous velocity range is equivalent to a velocity measurement range of a SIMO radar in a same cycle. In this way, a velocity of a target may be accurately estimated.

In a possible design, the separately performing, by using the first estimate, angle compensation on M second echo signals received by a first receive antenna, to obtain M first compensated echo signals may include: constructing a first steering vector based on the first estimate and structural position information of an antenna array element of the radar apparatus, where the first steering vector includes angle information in the first echo signals corresponding to the M transmit antennas corresponding to the first target; and separately multiplying the M second echo signals by the first steering vector to obtain the M first compensated echo signals.

The M first compensated echo signals are obtained by separately multiplying the M second echo signals by the first steering vector, and may be specifically obtained by using the following formula:

$$\left[\exp\left\{j2\pi\frac{d_{T1,Tref}}{\lambda}\sin\theta\right\}, \exp\left\{j2\pi\left[\frac{d_{T1,Tref}}{\lambda}\sin\theta + (f_d + 2\xi f_{d,max})T\right]\right\}, \ldots, \exp\left\{j2\pi\left[\frac{d_{TM,Tref}}{\lambda}\sin\theta + (M-1)(f_d + 2\xi f_{d,max})T\right]\right\}\right]$$

$$\bullet\left[\exp\left(-j2\pi\frac{d_{T_1,Rref}\sin\theta}{\lambda}\right), \exp\left(-j2\pi\frac{d_{T_2,Rref}\sin\theta}{\lambda}\right), \ldots, \exp\left(-j2\pi\frac{d_{TM,Rref}\sin\theta}{\lambda}\right)\right],$$

where • represents dot multiplication.

$d_{Tm,Tref}$ represents a distance between an $m^{th}$ transmit antenna and a reference transmit antenna, where m is all integers from 1 to M; θ represents the direction of arrival formed by the at least two receive antennas and the first target; $f_d+2\xi f_{d,max}$ may also be represented as $f_{d,real}$, that is, a real Doppler frequency of the first target, where $f_d$ represents a Doppler frequency estimate of the first target, and ξ represents a velocity aliasing coefficient of the first target; $d_{Rn,Rref}$ represents a distance between an $n^{th}$ receive antenna and a reference receive antenna, where n is all integers from 1 to N; and N represents a quantity of receive antenna array elements used in estimating the direction of arrival, where N meets 2≤N≤N.

In a possible design, before the determining, based on first echo signals received by at least two receive antennas in the N receive antennas, a first estimate of a direction of arrival formed by the at least two receive antennas and a first target, the method may further include: obtaining M*N first range-Doppler maps corresponding to signals received by the N receive antennas; performing superposition processing on the M*N first range-Doppler maps to obtain a second range-Doppler map; and determining, from the second range-Doppler map, the first echo signals received by the at least two receive antennas.

Performing superposition processing on the M*N first range-Doppler maps may help improve a signal-to-noise ratio during target detection, so that the target may be more accurately detected.

In a possible design, the determining, from the second range-Doppler map, the first echo signals received by the at least two receive antennas may include: performing target detection on the second range-Doppler map to obtain a first position of the first target in the second range-Doppler map; determining M*N range-Doppler signals of the first target from the first position in the M*N first range-Doppler maps; and determining, from the M*N range-Doppler signals, the first echo signals received by the at least two receive antennas. In this way, the range-Doppler signals corresponding to the first target may be accurately determined from the M*N first range-Doppler maps, to accurately determine the signals used to estimate the direction of arrival of the first target.

In a possible design, the superposition processing includes any one of the following: coherent superposition, incoherent superposition, or half-coherent superposition.

In a possible design, the performing superposition processing on the M*N first range-Doppler maps to obtain a second range-Doppler map includes: for each of the M transmit antennas, performing: determining, from the M*N first range-Doppler maps, at least two first range-Doppler maps corresponding to each transmit antenna; performing coherent superposition on the at least two first range-Doppler maps corresponding to each transmit antenna, to obtain a third range-Doppler map corresponding to each transmit antenna; and performing incoherent superposition processing on the third range-Doppler map corresponding to each of the M transmit antennas, to obtain the second range-Doppler map. This manner is a half-coherent superposition manner, and may improve a signal-to-noise ratio during target detection, so that the target may be more accurately detected. However, this half-coherent superposition manner is between a coherent superposition manner and an incoherent superposition manner in both a signal-to-noise ratio improvement effect and calculation complexity.

In a possible design, performing coherent superposition processing on at least two first range-Doppler maps corresponding to a first transmit antenna, to obtain a third range-Doppler map corresponding to the transmit antenna may include: for a plurality of preset angles, separately compensating, by using each preset angle, signals corresponding to each position in the at least two first range-Doppler maps corresponding to the first transmit antenna, to obtain at least two compensated first range-Doppler maps corresponding to each preset angle; and performing coherent superposition on the at least two compensated first range-Doppler maps corresponding to each preset angle, to obtain third range-Doppler maps respectively corresponding to the plurality of preset angles; and determining, from a same position in the third range-Doppler maps respectively corresponding to the plurality of preset angles, superposed signals respectively corresponding to the plurality of preset angles, and determining, from the superposed signals respectively corresponding to the plurality of preset angles, a first angle corresponding to a superposed signal with a largest energy value; and the determining, based on first echo signals received by at least two receive antennas in the N receive antennas, a first estimate of a direction of arrival formed by the receive antennas and a first target includes: using a first angle corresponding to a superposed signal with a largest energy value in superposed signals at the first position as the first estimate.

In this design, an interval of a plurality of preset angles may be selected as required. For example, more preset angles may be detected in an angle range of interest, so that a more accurate direction of arrival may be estimated.

In a possible design, the separately compensating, by using each preset angle, signals corresponding to each position in the at least two first range-Doppler maps corresponding to the first transmit antenna, to obtain at least two compensated first range-Doppler maps corresponding to each preset angle may include: constructing a second steering vector based on each preset angle and structural position information of an antenna array element of the radar apparatus, where the second steering vector includes angle information in the first echo signals respectively received by the at least two receive antennas corresponding to the first target; and multiplying the signals corresponding to each position in the at least two first range-Doppler maps corresponding to the first transmit antenna by the second steering vector, to obtain the at least two compensated first range-Doppler maps corresponding to each preset angle.

In a possible design, the performing coherent superposition processing on the at least two first range-Doppler maps corresponding to the transmit antenna, to obtain a third range-Doppler map corresponding to the transmit antenna includes: performing Fourier transform on signals at each position in the at least two first range-Doppler maps corresponding to the transmit antenna, to obtain the third range-Doppler map corresponding to the transmit antenna and a second angle corresponding to the signals at each position; and the determining, based on first echo signals received by at least two receive antennas in the N receive antennas, a first estimate of a direction of arrival formed by the receive antennas and a first target includes: using a second angle corresponding to signals at the first position as the first estimate.

In a possible design, the performing velocity estimation based on at least two first compensated echo signals in the M first compensated echo signals, to obtain a velocity of the first target may include: performing frequency estimation on the M first compensated echo signals to obtain a first Doppler frequency; performing, by using the first Doppler frequency, Doppler compensation on K third echo signals received by each receive antenna in a same measurement dimension, to obtain K second compensated echo signals corresponding to each receive antenna in the same measurement dimension, where the K third echo signals are echo signals formed after transmit signals transmitted by K transmit antennas in the time division transmit mode are reflected by the first target, the K transmit antennas and the receive antenna belong to the same measurement dimension, and K is a positive integer less than M; performing angle estimation based on the K second compensated echo signals to obtain a second estimate of the direction of arrival; and if an absolute value of a difference between the first estimate and the second estimate is less than or equal to a preset threshold, determining the velocity of the first target based on the first Doppler frequency.

Herein, the measurement dimension is a spatial dimension in which a radar may measure target information, for example, may be a horizontal dimension or a vertical dimension. The horizontal dimension is a direction parallel to a horizontal plane, and the vertical dimension is a direction perpendicular to the horizontal plane. The same measurement dimension is a same horizontal dimension or a same vertical dimension.

The first estimate is obtained through estimation based on subarray information (first echo signals received by at least two receive antennas). An array element of a subarray is relatively short, and angular resolution is not high enough. Therefore, there may be an error in measurement of the first target. The second estimate is obtained through estimation based on information about a full array, angular resolution is high, and an accurate direction of arrival may be obtained. Therefore, when the absolute value of the difference between the first estimate and the second estimate is less than or equal to the preset threshold, it indicates that the first estimate used to compensate the second echo signals is relatively accurate, so that the velocity of the first target may be accurately estimated.

In a possible design, after the performing angle estimation based on the K second compensated echo signals to obtain a second estimate of the direction of arrival, the method may further include: if the absolute value of the difference between the first estimate and the second estimate is greater than the preset threshold, performing, based on the second estimate, angle compensation on M second echo signals received by the same receive antenna, to obtain M third compensated echo signals; performing frequency estimation processing on the M third compensated echo signals to obtain a second Doppler frequency; performing, by using the second Doppler frequency, Doppler compensation on K third echo signals received by each receive antenna in a same measurement dimension, to obtain K fourth compensated echo signals corresponding to each receive antenna in the same measurement dimension; performing angle estimation based on the K fourth compensated echo signals to obtain a third estimate of the direction of arrival; and if an absolute value of a difference between the second estimate and the third estimate is less than or equal to the preset threshold, determining the velocity of the first target based on the second Doppler frequency.

When the absolute value of the difference between the first estimate and the second estimate is greater than the preset threshold, it indicates that the first estimate used to compensate the second echo signals is inaccurate, and then the second estimate obtained through estimation based on the information about the full array is used to compensate the third echo signals. Then, the velocity of the first target may be accurately estimated.

According to a second aspect, this application provides a velocity ambiguity resolving method. The method is applied to a radar apparatus including G groups of transmit antennas and N receive antennas, where the G groups of transmit antennas include M transmit antennas. The G groups of transmit antennas transmit signals in a time division transmit mode, and transmit antennas included in each group of transmit antennas transmit signals in a code division transmit mode. G and M are integers greater than 1, and N is a positive integer. The method includes: calculating, for first echo signals received by at least two receive antennas in the N receive antennas, a fourth estimate of a direction of arrival formed by the receive antennas and a first target, where the fourth echo signals are echo signals formed after transmit signals sent by a same group of transmit antennas are reflected by the first target; performing, based on the fourth estimate, angle compensation on M fifth echo signals received by a same receive antenna, to obtain M fifth compensated echo signals, where the M fifth echo signals are echo signals formed after transmit signals transmitted by the M transmit antennas are reflected by the first target; and performing velocity estimation based on at least two fifth compensated echo signals in the M fifth compensated echo signals, to obtain a velocity of the first target.

According to a third aspect, an embodiment of this application provides an echo signal processing apparatus. The apparatus may be a radar or may be a semiconductor chip disposed in the radar. The apparatus has a function of implementing the first aspect or various possible designs of the first aspect, or has a function of implementing the second aspect. The function may be implemented by hardware, or may be implemented by hardware executing corresponding software. The hardware or the software includes one or more units or modules corresponding to the foregoing function.

According to a fourth aspect, an embodiment of this application provides an echo signal processing apparatus. The apparatus includes a processor, a memory, and instructions that are stored in the memory and that can be run on the processor. When the instructions are run, the apparatus is enabled to perform the method according to any one of the first aspect or the possible designs of the first aspect, or perform the method according to the second aspect.

According to a fifth aspect, an embodiment of this application provides a computer-readable storage medium, including instructions. When the instructions are run on a computer, the computer is enabled to perform the method according to any one of the first aspect or the possible designs of the first aspect, or perform the method according to the second aspect.

According to a sixth aspect, an embodiment of this application provides a computer program product. When the computer program product runs on a computer, the computer is enabled to perform the method according to any one of the first aspect or the possible designs of the first aspect, or perform the method according to the second aspect.

These aspects or other aspects of this application are clearer and easier to understand in descriptions of the following embodiments.

DESCRIPTION OF EMBODIMENTS

To make objectives, technical solutions, and advantages of this application clearer, the following further describes this application in detail with reference to the accompanying drawings.

The following describes some terms in the embodiments of this application, to facilitate understanding by a person skilled in the art.

(1) A radar may also be referred to as a radar apparatus, and generally works in an ultrashort wave band or a microwave band. A radar working in the ultrashort wave band is referred to as an ultrashort wave radar, and a radar working in the microwave band is referred to as a microwave radar. Microwave radars are sometimes subdivided into decimeter wave radars, centimeter wave radars, millimeter wave radars, and the like. A working principle of the radar is to detect a corresponding target object by using a transmit signal (or referred to as a detection signal) and receiving a reflected signal reflected by the target object.

Figure 1A:
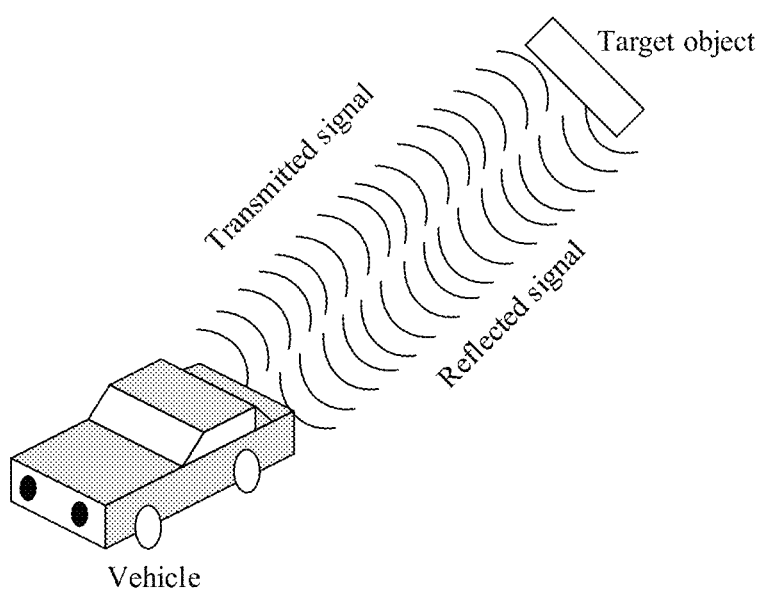
FIG. 1a is a schematic diagram of a principle of detecting a target object by a radar according to an embodiment of this application.

FIG. 1a is a schematic diagram of a principle of detecting a target object by a radar. The radar transmits a detection signal (an electromagnetic wave) (which may also be referred to as a transmit signal) by using a transmit antenna, and receives, by using a receive antenna, a signal (which may also be referred to as an echo signal) reflected by the target object. Processing such as amplification and down-conversion is performed on the signal reflected by the target object, to obtain information such as a relative distance and a relative velocity between a vehicle and the target object, thereby determining a position of the target object.

(2) A target object may be any target whose distance and/or velocity need/needs to be measured, for example, may be a moving object or may be a stationary object.

(3) A frequency modulated continuous wave (FMCW) is an electromagnetic wave whose frequency varies with a time. In the following description, an FMCW radar is used as an example. It should be noted that this application may also be applied to other types of radars, and a type of the radar is not limited in this application.

(4) A range-Doppler map (RD map) is obtained by separately performing pulse compression and Doppler processing on an N*M matrix into which echo signals received by a receiving array of a radar are arranged. Each RD map corresponds to one virtual antenna. For example, a radar including two transmit antennas and four receive antennas may correspond to eight RD maps.

(5) "At least one" means one or more, "at least two" means two or more, and "a plurality of" means two or more. "And/or" describes an association relationship between associated objects, and indicates that three relationships may exist. For example, A and/or B may indicate the following cases: Only A exists, both A and B exist, and only B exists, where A and B may be singular or plural. The character "/" usually indicates an "or" relationship between the associated objects. "At least one of the following items (pieces)" or a similar expression thereof means any combination of these items, including a single item (piece) or any combination of plural items (pieces). For example, at least one of a, b, or c may indicate a, b, c, a and b, a and c, b and c, or a, b, and c, where a, b, and c may be singular or plural.

In addition, unless otherwise stated, in the embodiments of this application, ordinal numbers such as "first" and "second" are used to distinguish between a plurality of objects, and are not intended to limit an order, a time sequence, a priority, or importance of the plurality of objects. For example, a first echo signal and a second echo signal are merely used to distinguish between different echo signals, but do not indicate different priorities, sending sequences, importance, or the like of the two echo signals.

Figure 1B:
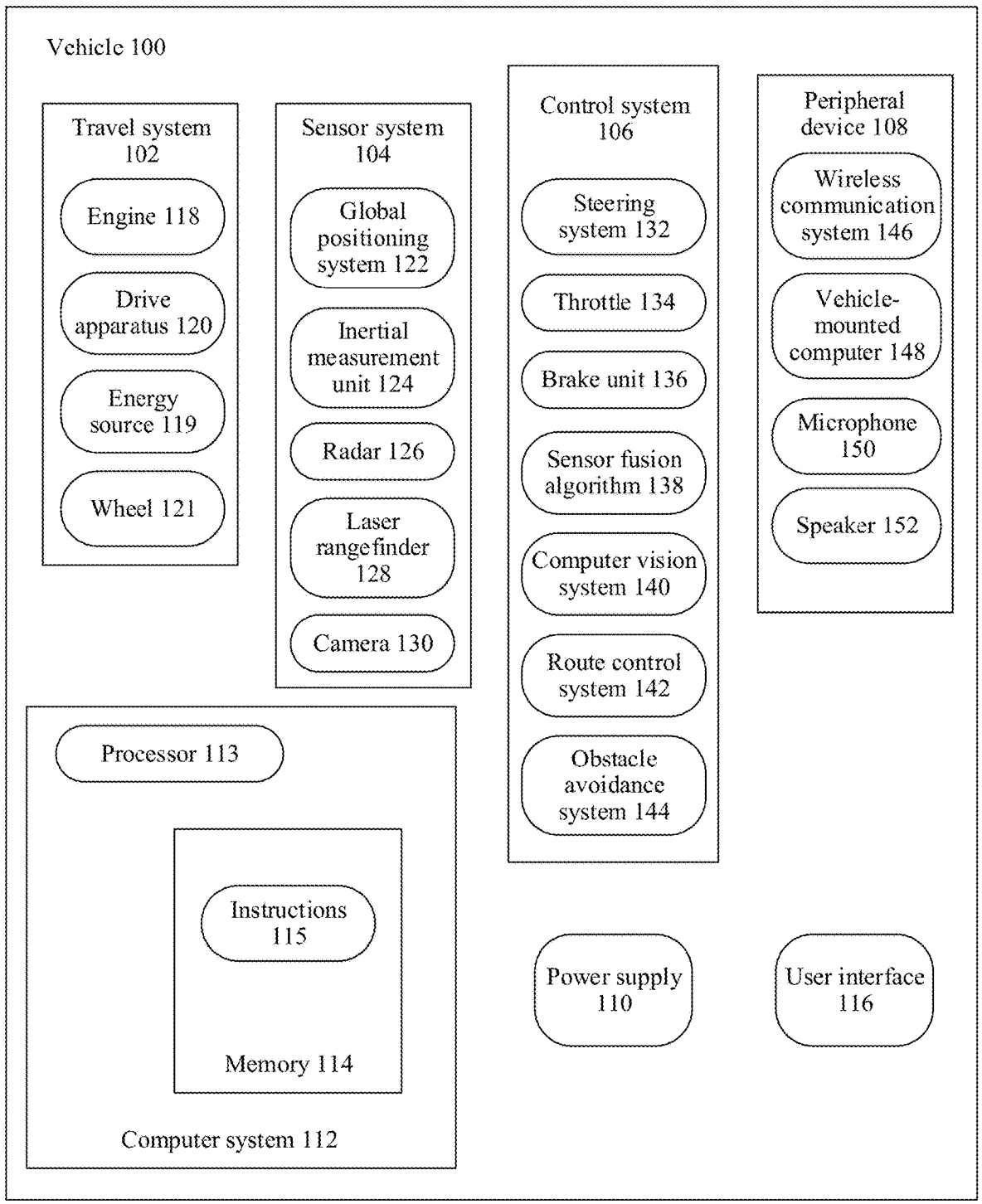
FIG. 1b is a schematic diagram of a principle of detecting a target object by a radar according to an embodiment of this application.

FIG. 1b is a function block diagram of a vehicle 100 according to an embodiment of this application. In an embodiment, the vehicle 100 is configured to be in a fully or partially autonomous driving mode. For example, the vehicle 100 may control the vehicle 100 when the vehicle 100 is in an autonomous driving mode, and may determine current statuses of the vehicle and an ambient environment of the vehicle through a manual operation, determine possible behavior of at least one another vehicle in the ambient environment, determine a confidence level corresponding to a possibility that the another vehicle performs the possible behavior, and control the vehicle 100 based on determined information. When the vehicle 100 is in the autonomous driving mode, the vehicle 100 may be set to operate without interaction with a person.

The vehicle 100 may include various subsystems, for example, a travel system 102, a sensor system 104, a control system 106, one or more peripheral devices 108, a power supply 110, a computer system 112, and a user interface 116. Optionally, the vehicle 100 may include more or fewer subsystems, and each subsystem may include a plurality of elements. In addition, all the subsystems and elements of the vehicle 100 may be interconnected in a wired or wireless manner.

The travel system 102 may include a component that provides power for the vehicle 100 to move. In an embodiment, the travel system 102 may include an engine 118, an energy source 119, a drive apparatus 120, and a wheel/tire 121. The engine 118 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 118 converts the energy source 119 into mechanical energy.

Examples of the energy source 119 include gasoline, diesel, other oil-based fuels, propane, other compressed gas-based fuels, ethanol, solar panels, batteries, and other power sources. The energy source 119 may also provide energy for another system of the vehicle 100.

The drive apparatus 120 may transmit mechanical power from the engine 118 to the wheel 121. The drive apparatus 120 may include a gearbox, a differential, and a drive shaft. In an embodiment, the drive apparatus 120 may further include another component, for example, a clutch. The drive shaft may include one or more shafts that may be coupled to one or more wheels 121.

The sensor system 104 may include several sensors that sense information about an ambient environment of the vehicle 100. For example, the sensor system 104 may include a positioning system 122 (where the positioning system may be a GPS system, a BeiDou system, or another positioning system), an inertial measurement unit (IMU) 124, a radar 126, a laser rangefinder 128, and a camera 130. The sensor system 104 may further include sensors (for example, an in-vehicle air quality monitor, a fuel gauge, and an oil temperature gauge) in an internal system of the monitored vehicle 100. Sensor data from one or more of these sensors can be used to detect an object and corresponding features (a position, a shape, a direction, a velocity, and the like) of the object. Such detection and identification are key functions of a safety operation of the autonomous vehicle 100.

The positioning system 122 may be configured to estimate a geographical location of the vehicle 100. The IMU 124 is configured to sense location and orientation changes of the vehicle 100 based on inertial acceleration. In an embodiment, the IMU 124 may be a combination of an accelerometer and a gyroscope.

The radar 126 may sense an object in the ambient environment of the vehicle 100 by using a radio signal. In some embodiments, in addition to sensing the object, the radar 126 may be further configured to sense a velocity and/or a moving direction of the object.

The laser rangefinder 128 may sense, by using a laser, an object in an environment in which the vehicle 100 is located. In some embodiments, the laser rangefinder 128 may include one or more laser sources, a laser scanner, one or more detectors, and another system component.

The camera 130 may be configured to capture a plurality of images of the ambient environment of the vehicle 100. The camera 130 may be a static camera or a video camera.

The control system 106 controls operations of the vehicle 100 and the components of the vehicle 100. The control system 106 may include various elements, including a steering system 132, a throttle 134, a brake unit 136, a sensor fusion algorithm 138, a computer vision system 140, a route control system 142, and an obstacle avoidance system 144.

The steering system 132 may operate to adjust a moving direction of the vehicle 100. For example, in an embodiment, the steering system 132 may be a steering wheel system.

The throttle 134 is configured to: control an operating velocity of the engine 118 and further control a velocity of the vehicle 100.

The brake unit 136 is configured to control the vehicle 100 to decelerate. The brake unit 136 may use friction to reduce a rotational velocity of the wheel 121. In another embodiment, the brake unit 136 may convert kinetic energy of the wheel 121 into current. The brake unit 136 may alternatively reduce a rotational velocity of the wheel 121 by using other methods, to control the velocity of the vehicle 100.

The computer vision system 140 may operate to process and analyze images captured by the camera 130 to identify objects and/or features in the ambient environment of the vehicle 100. The objects and/or features may include traffic signals, road boundaries, and obstacles. The computer vision system 140 may use an object recognition algorithm, a structure from motion (SFM) algorithm, video tracking, and other computer vision technologies. In some embodiments, the computer vision system 140 may be configured to: draw a map for an environment, track an object, estimate a velocity of the object, and the like.

The route control system 142 is configured to determine a travel route of the vehicle 100. In some embodiments, the route control system 142 may determine a driving route for the vehicle 100 with reference to data from sensors 138, the GPS 122, and one or more predetermined maps.

The obstacle avoidance system 144 is configured to identify, evaluate, and avoid or surpass a potential obstacle in the environment of the vehicle 100 in another manner.

Certainly, for example, the control system 106 may add or alternatively include components in addition to those shown and described. Alternatively, the control system 106 may delete some of the components shown above.

The vehicle 100 interacts with an external sensor, another vehicle, another computer system, or a user by using the peripheral device 108. The peripheral device 108 may include a wireless communication system 146, a vehicle-mounted computer 148, a microphone 150, and/or a speaker 152.

In some embodiments, the peripheral device 108 provides a means for a user of the vehicle 100 to interact with the user interface 116. For example, the vehicle-mounted computer 148 may provide information for the user of the vehicle 100. The user interface 116 may further operate the vehicle-mounted computer 148 to receive user input. The vehicle-mounted computer 148 may perform operations through a touchscreen. In another case, the peripheral device 108 may provide a means for the vehicle 100 to communicate with another device located in the vehicle. For example, the microphone 150 may receive audio (for example, according to a voice command or based on other audio input) from the user of the vehicle 100. Similarly, the speaker 152 may output audio to the user of the vehicle 100.

The wireless communication system 146 may communicate wirelessly with one or more devices directly or through a communication network. For example, the wireless communication system 146 may use 3G cellular communication such as CDMA, EVD0, or GSM/GPRS, use 4G cellular communication such as LTE, or use 5G cellular communication. The wireless communication system 146 may communicate with a wireless local area network (WLAN) by using Wi-Fi. In some embodiments, the wireless communication system 146 may directly communicate with a device through an infrared link, Bluetooth, or ZigBee. Other wireless protocols, for example, various vehicle communication systems, such as the wireless communication system 146, may include one or more dedicated short range communications (DSRC) devices, and these devices may include public and/or private data communication between the vehicle and/or roadside stations.

The power supply 110 may supply power to various components of the vehicle 100. In an embodiment, the power supply 110 may be a rechargeable lithium-ion or lead-acid battery. One or more battery packs of such batteries may be configured as the power supply to supply power to the components of the vehicle 100. In some embodiments, the power supply 110 and the energy source 119 may be implemented together, for example, in some pure electric vehicles.

Some or all functions of the vehicle 100 are controlled by the computer system 112. The computer system 112 may include at least one processor 113. The processor 113 executes instructions 115 stored in a non-transitory computer-readable medium such as a memory 114. The computer system 112 may alternatively be a plurality of computing devices that control an individual component or a subsystem of the vehicle 100 in a distributed manner.

The processor 113 may be any conventional processor, such as a commercially available CPU. Alternatively, the processor may be a dedicated device such as an ASIC or another hardware-based processor. Although FIG. 1b shows a function diagram including a processor, a memory, and other components of the computer 110 in the same block, a person of ordinary skill in the art should understand that the processor, the computer, or the memory may actually include a plurality of processors, computers, or memories that may or may not be stored in the same physical housing. For example, the memory may be a hard disk drive, or another storage medium located in a housing different from that of the computer 110. Thus, it is understood that a reference to the processor or the computer includes a reference to a set of processors or computers or memories that may or may not operate in parallel. Different from using a single processor to perform the steps described herein, some components such as a steering component and a deceleration component each may include respective processors. The processor performs only computation related to a component-specific function.

In various aspects described herein, the processor may be located far away from the vehicle and wirelessly communicate with the vehicle. In other aspects, some of the processes described herein are performed on the processor disposed inside the vehicle, while others are performed by a remote processor. The processes include necessary steps for performing a single operation.

In some embodiments, the memory 114 may include the instructions 115 (for example, program logic), and the instructions 115 may be executed by the processor 113 to perform various functions of the vehicle 100, including the functions described above. The memory 114 may also include additional instructions, including instructions used to send data to, receive data from, interact with, and/or control one or more of the travel system 102, the sensor system 104, the control system 106, and the peripheral device 108.

In addition to the instructions 115, the memory 114 may further store data, such as a road map, route information, a location, a direction, a velocity, and other vehicle data of the vehicle, and other information. Such information may be used by the vehicle 100 and the computer system 112 when the vehicle 100 operates in an autonomous mode, a semi-autonomous mode, and/or a manual mode.

The user interface 116 is configured to provide information for or receive information from the user of the vehicle 100. Optionally, the user interface 116 may include one or more input/output devices within a set of peripheral devices 108, such as the wireless communication system 146, the vehicle-mounted computer 148, the microphone 150, and the speaker 152.

The computer system 112 may control functions of the vehicle 100 based on input received from various subsystems (for example, the travel system 102, the sensor system 104, and the control system 106) and from the user interface 116. For example, the computer system 112 may use input from the control system 106 to control the steering unit 132 to avoid an obstacle detected by the sensor system 104 and the obstacle avoidance system 144. In some embodiments, the computer system 112 may operate to provide control over many aspects of the vehicle 100 and the subsystems of the vehicle 100.

Optionally, one or more of the foregoing components may be installed separately from or associated with the vehicle 100. For example, the memory 114 may exist partially or completely separate from the vehicle 100. The foregoing components may be communicatively coupled together in a wired and/or wireless manner.

Optionally, the foregoing components are merely examples. In actual application, components in the foregoing modules may be added or deleted depending on actual requirements. FIG. 1b should not be understood as any limitation on the embodiments of this application.

A self-driving vehicle driving on a road, such as the vehicle 100, may recognize an object within an ambient environment of the vehicle to determine an adjustment to a current velocity. The object may be another vehicle, a traffic control device, or an object of another type. In some examples, each recognized object may be considered independently and the velocity adjustment that the autonomous driving vehicle is to be made may be determined based on a respective characteristic of the object, such as a current velocity and acceleration of the object and a distance between the object and the vehicle.

Optionally, the autonomous driving vehicle 100 or a computing device associated with the autonomous driving vehicle 100 (for example, the computer system 112, the computer vision system 140, or the memory 114 in FIG. 1b) may predict behavior of the identified object based on a feature of the identified object and a status of the ambient environment (for example, traffic, rain, and ice on a road). Optionally, all the recognized objects depend on behavior of each other, and therefore, all the recognized objects may be considered together to predict behavior of a single recognized object. The vehicle 100 can adjust the velocity of the vehicle based on the predicted behavior of the recognized object. In other words, the autonomous driving vehicle can determine, based on the predicted behavior of the object, a stable state to which the vehicle needs to be adjusted (for example, acceleration, deceleration, or stop). In this process, another factor may also be considered to determine the velocity of the vehicle 100, for example, a horizontal location of the vehicle 100 on a road on which the vehicle travels, a curvature of the road, and proximity between a static object and a dynamic object.

In addition to providing an instruction for adjusting the velocity of the autonomous driving vehicle, the computing device may provide an instruction for modifying a steering angle of the vehicle 100, so that the autonomous driving vehicle follows a given trajectory and/or maintains safe transverse and longitudinal distances from an object (for example, a car in an adjacent lane on the road) next to the autonomous driving vehicle.

The vehicle 100 may be a car, a truck, a motorcycle, a bus, a boat, an airplane, a helicopter, a lawn mower, a recreational vehicle, a playground vehicle, a construction device, a trolley, a golf cart, a train, a handcart, or the like. This is not specifically limited in this embodiment of this application.

Figure 2A:
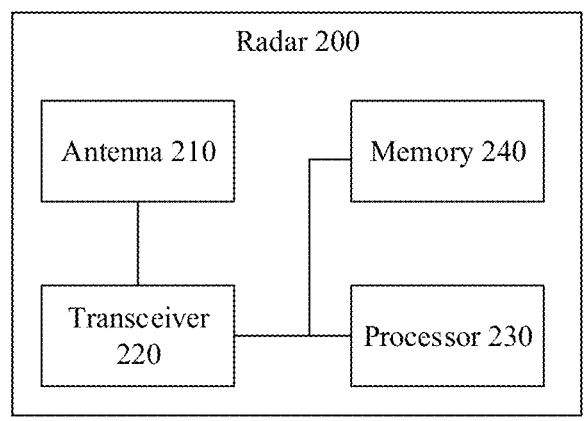
FIG. 2a and FIG. 2b are a schematic diagram of a hardware structure of a radar according to an embodiment of this application.
Figure 2B:
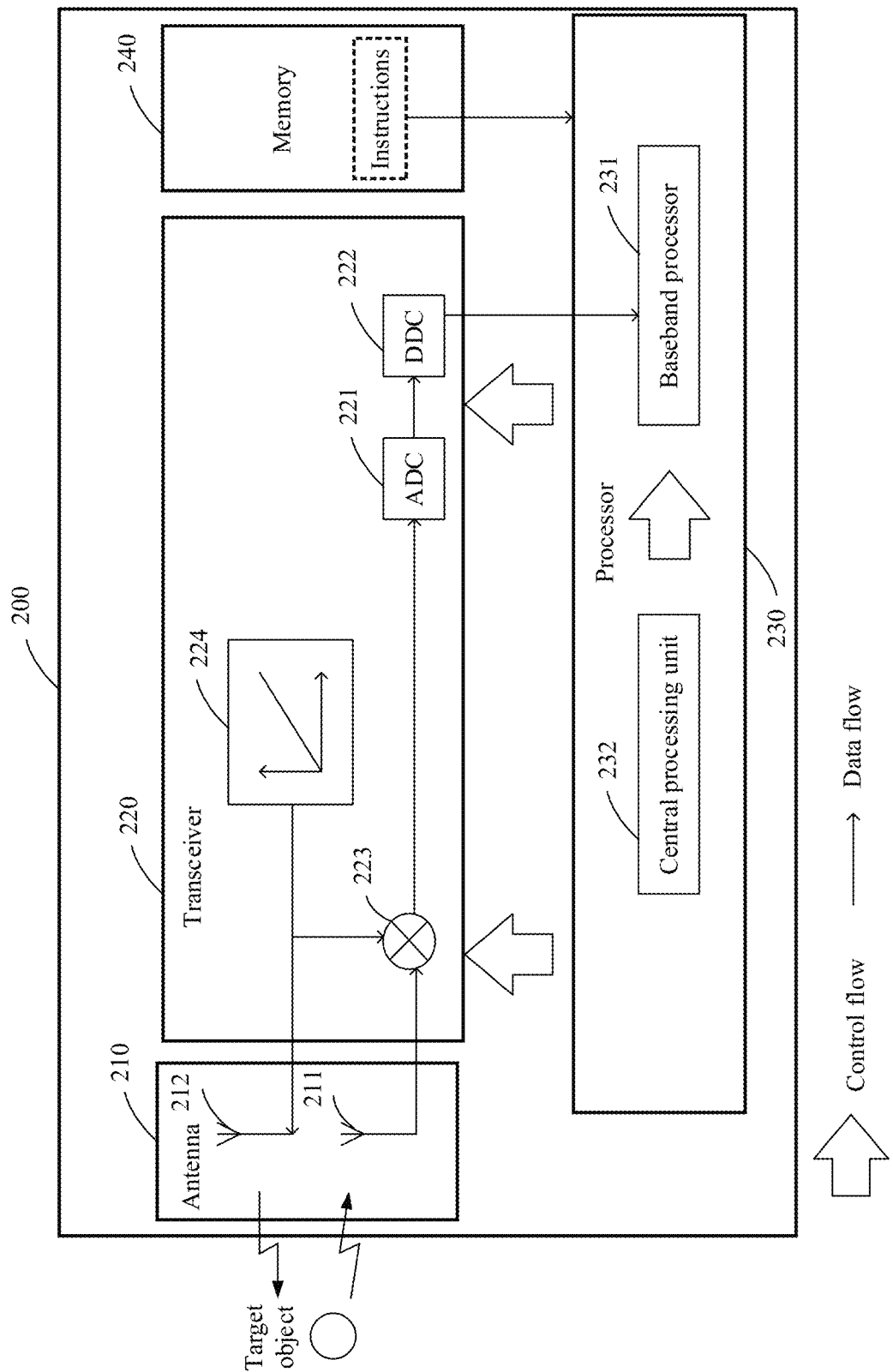

FIG. 2a and FIG. 2b are a schematic diagram of a hardware structure of a radar according to an embodiment of this application.

As shown in FIG. 2a, the radar 200 may include an antenna 210, a transceiver 220, one or more processors 230 (only one processor is shown in FIG. 2a and FIG. 2b), and one or more memories 240 (only one memory is shown in FIG. 2a and FIG. 2b).

Specifically, with reference to FIG. 2b, the antenna 210 may include a receive antenna 211 and a transmit antenna 212. The transmit antenna 212 is configured to transmit a signal to a target object, and the receive antenna 211 is configured to receive an echo signal transmitted or reflected by the target object.

The transceiver 220 may be referred to as a transmitter-receiver, a transceiver circuit, or the like, and is configured to implement a transceiver function of the radar. Specifically, the transceiver 220 may include a frequency synthesizer 224. The frequency synthesizer 224 is configured to synthesize, under control of the processor 230, a linear frequency modulation signal (a phase of the signal varies with a time and is a quadratic function of the time, and a frequency of the signal, that is, a first-order derivative of the phase, is a linear function of the time, that is, the frequency linearly varies with the time) by using a voltage-controlled oscillator (VCO) in the frequency synthesizer 224. The linear frequency modulation signal is transmitted by using the transmit antenna 212.

The transceiver 220 may further include a frequency mixer 223. The frequency mixer 223 is configured to perform down-conversion on a signal received by the receive antenna 211, to obtain, through screening, a frequency component related to the target object. Specifically, the frequency mixer 223 has two input signals (one input signal is the signal received by the receive antenna 211, and the other input signal is a signal generated by the voltage-controlled oscillator), and may obtain an output signal by multiplying the two input signals. A frequency of the output signal may be a sum (or a difference) of frequencies of the two input signals, so that a signal frequency is converted from one value to another value.

The transceiver 220 may further include an analog-to-digital converter (ADC) 221 and a digital down-converter (DDC) 222. The ADC 221 is configured to perform, under control of the processor 230, analog-to-digital conversion on a signal (whose frequency meets a Nyquist sampling theorem) down-converted by the frequency mixer 223. To facilitate subsequent signal processing by the processor 230, the DDC 222 may be further used to generate a zero intermediate frequency signal from a digital signal output by the ADC 221.

In addition, the transceiver 220 further includes an amplifier (not shown in FIG. 2b), configured to perform power amplification on a received signal after the receive antenna 211 receives the signal transmitted or reflected by the target object, or configured to perform power amplification on a to-be-transmitted signal before the transmit antenna 212 transmits the signal.

The processor 230 may include a general purpose processor (which may be, for example, a central processing unit) and/or a dedicated processor (which may be, for example, a baseband processor). That the processor 230 includes a central processing unit 232 and a baseband processor 231 is used as an example. The baseband processor 231 may determine, based on a signal obtained through processing by the DDC 222, whether there is a target object, and after determining that there is a target object, measure an angle and a distance of the target object relative to the radar 200, and perform a method according to the embodiments of this application to determine a velocity of the target object. Further, before measuring the angle, the velocity, and the distance of the target object relative to the radar 200, the baseband processor 231 may further perform anti-interference processing such as cross-correlation processing and filtering in time domain on the signal obtained through processing by the DDC 222. The central processing unit 232 may implement specific control functions (for example, controlling the transceiver 220 and the baseband processor 231 to perform corresponding operations), and may further perform operations such as target clustering, target tracking, and target association based on a measurement result of the baseband processor 231.

The memory 240 may store instructions, and the instructions may be run on the processor 230, so that the radar 200 performs the method described in the embodiments of this application. Optionally, the memory may further store data. Optionally, the processor may also store instructions and/or data, and the instructions and/or data may be run by the processor, so that the radar 200 performs the method described in the embodiments of this application. The processor and the memory may be separately disposed, or may be integrated together.

In an implementation, the processor and the transceiver described in this application may be integrated in an application-specific integrated circuit (ASIC). In another implementation, the processor and the transceiver may be separately disposed on a printed circuit board (PCB). The processor may be implemented by using an ASIC, or may be a general purpose processor. The transceiver may be implemented by using one or a combination of an ASIC, a field programmable gate array (FPGA), and a discrete component. The processor and the transceiver may alternatively be manufactured by using various IC process technologies, for example, a complementary metal oxide semiconductor (CMOS), an N-type metal oxide semiconductor (NMOS), a P-type metal oxide semiconductor (PMOS), a bipolar junction transistor (BJT), a bipolar CMOS (BiCMOS), silicon germanium (SiGe), and gallium arsenide (GaAs).

The following specifically describes the antennas of the radar provided in this embodiment of this application.

The transmit antenna 212 of the radar may include at least two transmit antennas, and the receive antenna 211 may include one or more receive antennas. The following uses a MIMO radar including an MTNR array as an example. That is, the radar includes M transmit antennas and N receive antennas, where M is an integer greater than 1, and N is an integer greater than 1.

Figure 3:
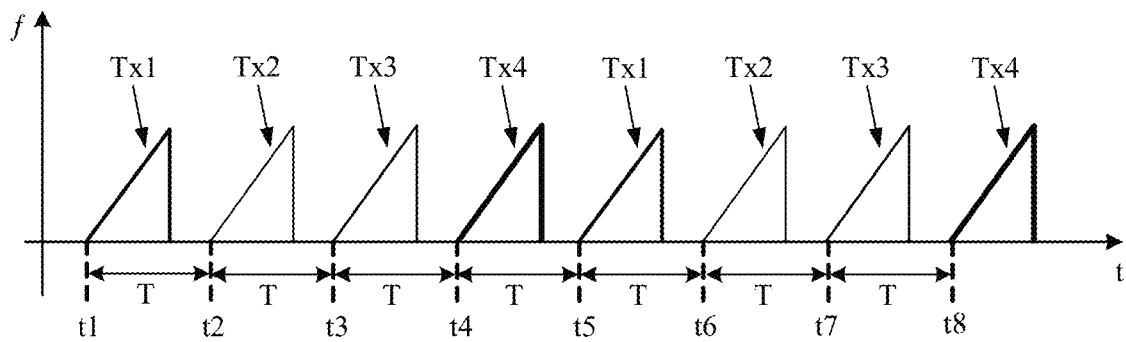
FIG. 3 is a schematic diagram in which a MIMO radar transmits signals in a TDM mode according to an embodiment of this application.

In an example, the M transmit antennas transmit signals in a time division multiplexing (TDM) mode. That is, different transmit antennas transmit signals at different start moments. FIG. 3 is a schematic diagram in which the MIMO radar transmits signals in the TDM mode. In FIG. 3, a horizontal coordinate t represents the time domain, and a vertical coordinate f represents a frequency domain. That the MIMO radar includes four transmit antennas that are respectively Tx1, Tx2, Tx3, and Tx4 is used as an example for description.

A radar signal generated by the frequency synthesizer 224 is a frequency modulated continuous wave. The four transmit antennas transmit a group of linear frequency modulation signals with a same waveform and different time starting points, and the linear frequency modulation signals may also be referred to as chirp signals. An interval (represented by T in FIG. 3) at which the chirp signals are transmitted is referred to as a pulse repetition time (PRT). The radar transmits one chirp signal in one PRT, and a time length of the chirp signal is less than or equal to one PRT. Generally, the time length of the chirp signal is less than one PRT. As shown in FIG. 3, in a same frame, the first round of transmitting is as follows: The transmit antenna Tx1 transmits a chirp signal 1 at a moment t1, the transmit antenna Tx2 transmits a chirp signal 2 at a moment t2, and a difference between t2 and t1 is T; the transmit antenna Tx3 transmits a chirp signal 3 at a moment t3, and a difference between t3 and t2 is T; and the transmit antenna Tx4 transmits a chirp signal 4 at a moment t4, and a difference between t4 and t3 is T. The second round of transmitting is as follows: The transmit antenna Tx1 transmits a chirp signal 1 at a moment t5, and a difference between t5 and t4 is T; the transmit antenna Tx2 transmits a chirp signal 2 at a moment t6, and a difference between t6 and t5 is T; the transmit antenna Tx3 transmits a chirp signal 3 at a moment t7, and a difference between t7 and t6 is T; and the transmit antenna Tx4 transmits a chirp signal 4 at a moment t8, and a difference between t8 and t7 is T. Therefore, in this example, two chirp signals transmitted by a same transmit antenna are separated by 4T. For example, the transmit antenna Tx2 transmits the first chirp signal at the moment t2, and transmits the second chirp signal at the moment t6, and a difference between t6 and t2 is 4T.

It should be noted that, first, the foregoing example is described by using an example in which the four transmit antennas transmit a group of linear frequency modulation signals with a same waveform and different time starting points. As shown in FIG. 3, slopes of chirp signals transmitted by various antennas in a same round of transmitting are the same. It should be understood that, in a same frame, signals transmitted by a same transmit antenna in different rounds are the same, and signals transmitted by two different transmit antennas in a same round of transmitting may be different. For example, in the first round of transmitting, slopes of signals transmitted by two transmit antennas may be different. Second, in a same round of transmitting, differences between moments at which any two adjacent transmit antennas transmit signals may not necessarily be all the same. For example, the difference between t2 and t1 is T, and the difference between t2 and t1 may be 1.2T. For ease of subsequent description, in the following embodiment, an example in which differences between moments at which any two adjacent transmit antennas transmit signals are T is used for description.

Figure 4:
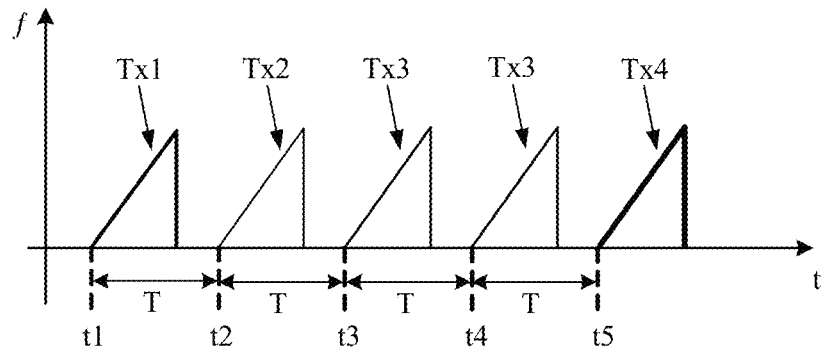
FIG. 4 is another schematic diagram in which a MIMO radar transmits signals in a TDM mode according to an embodiment of this application.

In another example, a transmit antenna may continuously transmit a plurality of chirp signals in a group of linear frequency modulation signals with a same waveform and different time starting points that are transmitted by using the four transmit antennas. For example, as shown in FIG. 4, Tx1 transmits a chirp signal 1 at a moment t1, Tx2 transmits a chirp signal 2 at a moment t2, Tx3 separately transmits chirp signals 3 at moments t3 and t4, Tx4 transmits a chirp signal 4 at a moment t5, and a time difference between chirp signals transmitted at adjacent moments is T.

In still another example, the M transmit antennas may be divided into G groups, and transmit antennas in each group may transmit signals in a frequency division multiplexing (FDM) mode. That is, different transmit antennas in each group transmit signals at different center frequencies. The G groups of transmit antennas may transmit signals in the TDM mode, and transmit antennas in different groups transmit signals at different moments. That is, the M transmit antennas also transmit signals in the TDM mode in time domain. It should be understood that quantities of transmit antennas included in different groups may be the same, or may be different.

It should be noted that a sequence in which the M transmit antennas included in the MIMO radar transmit chirp signals is not limited in this embodiment of this application. For example, for four transmit antennas 1, 2, 3, and 4, a sending sequence may be 1, 2, 3, and 4, or the sending sequence may be not arranged based on the foregoing label numbers, for example, 3, 2, 1, and 4. That is, the chirp signals may be sequentially sent based on an arrangement sequence of the transmit antennas, or may be sent out of sequence. The sequential sending herein means that the sending sequence of the antennas is consistent with a spatial neighboring relationship of the antennas in a physical layout, and the out-of-sequence sending means that the sending sequence of the antennas is inconsistent with the spatial neighboring relationship of the antennas in the physical layout. This is not repeated below.

Figure 5:
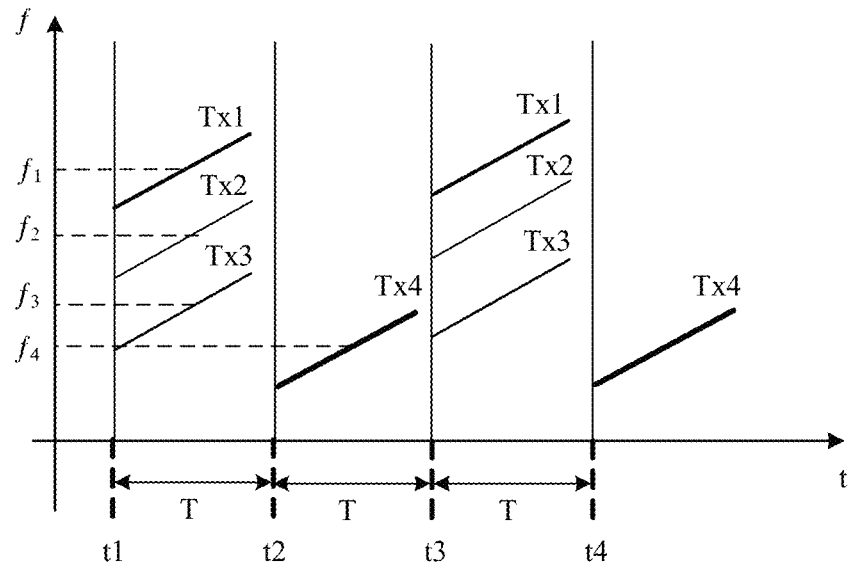
FIG. 5 is another schematic diagram in which a MIMO radar transmits signals in an FDM mode and a TDM mode according to an embodiment of this application.

FIG. 5 is a schematic diagram in which the MIMO radar transmits signals in the FDM mode and the TDM mode. In FIG. 5, a horizontal coordinate t represents the time domain, and a vertical coordinate f represents the frequency domain. FIG. 5 uses an example in which the MIMO radar includes four transmit antennas, and G is 2. That is, the four transmit antennas are divided into two groups. A first group includes three transmit antennas that are respectively Tx1, Tx2, and Tx3, and a second group includes one transmit antenna Tx4. It may be learned from FIG. 5 that the three transmit antennas in the first group separately transmit signals of different frequencies at a moment t1. A center frequency of a signal 1 transmitted by the transmit antenna Tx1 is f1, a center frequency of a signal 2 transmitted by the transmit antenna Tx2 is f2, and a center frequency of a signal 3 transmitted by the transmit antenna Tx3 is B. That is, different transmit antennas in the first group transmit signals at different center frequencies. A center frequency of a signal 4 transmitted by the transmit antenna Tx4 in the second group at a moment t2 is f4, and a difference between t2 and t1 is T. Then, the three transmit antennas in the first group separately transmit signals of different frequencies at a moment t3, and a difference between t3 and t2 is T. A center frequency of a signal 4 transmitted by the transmit antenna Tx4 in the second group at a moment t4 is f4, and a difference between t4 and t3 is T.

Figure 6:
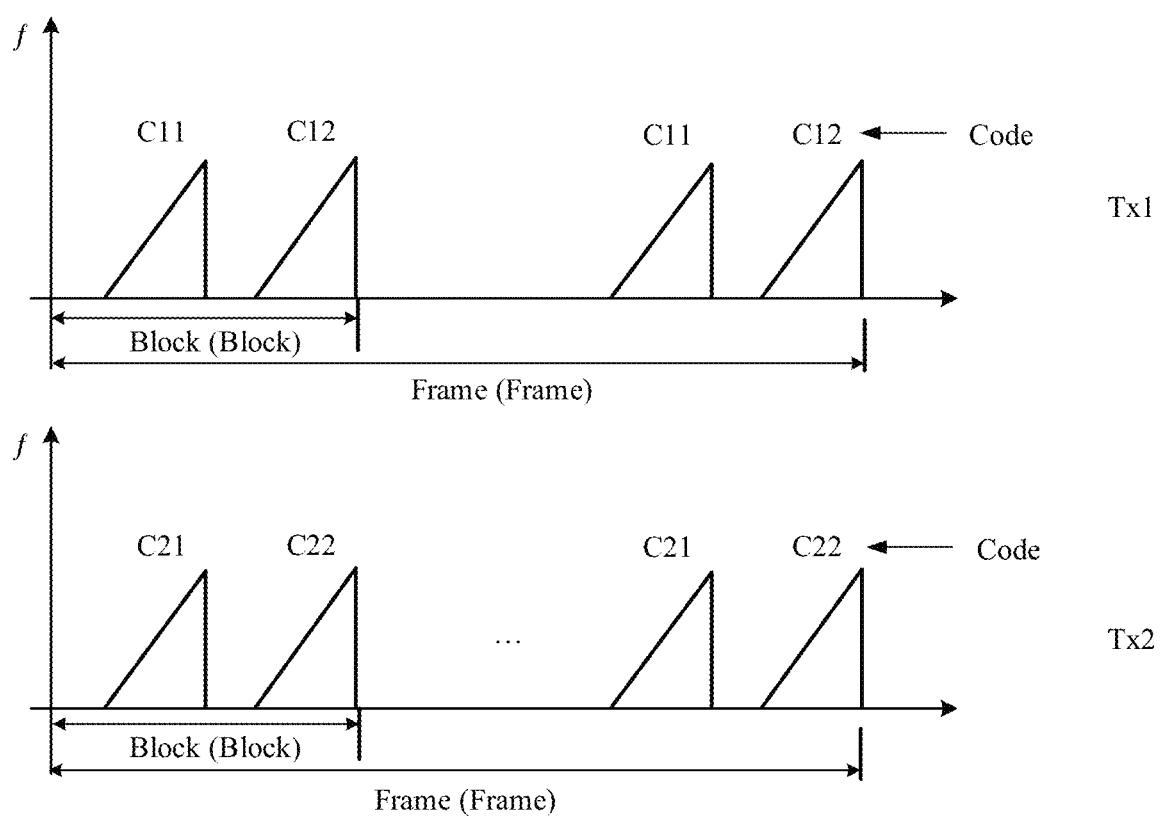
FIG. 6 is another schematic diagram in which a MIMO radar transmits signals in a CDM mode and a TDM mode according to an embodiment of this application.

FIG. 6 is a schematic diagram in which the MIMO radar transmits signals in a code division multiplexing (CDM) mode and the TDM mode.

FIG. 6 uses an example in which the MIMO radar includes four transmit antennas. A transmit antenna Tx1 and a transmit antenna Tx2 separately transmit transmit signals of a same center frequency, but the transmit signals separately transmitted by the two antennas are sent by using different codes. For example, at a same moment, Tx1 transmits a transmit signal whose code is C11, and Tx2 transmits a transmit signal whose code is C21.

It may be understood that the signal transmitting modes shown in FIG. 3 to FIG. 6 are merely examples, and a transmitting mode of a transmit signal in this application is not limited.

The receive antenna 211 of the radar receives an echo signal. That is, the receive antenna receives a signal reflected by the target object after a signal transmitted by the transmit antenna encounters the target object, and the frequency mixer 223 mixes the received echo signal and a local oscillator signal, to obtain an intermediate frequency signal. Information such as an angle between the target object and the radar system and a velocity of the target object may be determined based on the intermediate frequency signal.

It should be noted that the transmit antenna in this embodiment of this application may alternatively be replaced with a transmit channel, and the receive antenna may alternatively be replaced with a receive channel. This is not repeated below.

For a multiple-input multiple-output (MIMO) radar, that is, M is an integer greater than 1, and N is an integer greater than 1, the MIMO radar includes a plurality of transmit antennas and a plurality of receive antennas. A maximum unambiguous velocity range corresponding to the MIMO radar may be represented as $$v_{max} = \pm \frac{\lambda}{4MT},$$

and a maximum unambiguous Doppler range corresponding to the MIMO radar may be represented as $$f_{d,max} = \pm \frac{\lambda}{2MT}.$$

T represents a single chirp time, and $\lambda$ indicates a chirp wavelength. The maximum unambiguous Doppler range is a maximum range of a Doppler frequency in which an actual velocity may be measured. For a single-input multiple-output (SIMO) radar, that is, the SIMO radar includes one transmit antenna and a plurality of receive antennas, a maximum unambiguous velocity range corresponding to the SIMO radar may be represented as $$v_{max} = \pm \frac{\lambda}{4T},$$

and a maximum unambiguous Doppler range corresponding to the SIMO radar may be represented as $$f_{d,max} = \pm \frac{\lambda}{2T}.$$

T represents a single chirp time.

It may be learned that, relative to the SIMO radar with a same transmitting cycle, both the maximum unambiguous velocity range of the MIMO radar and the corresponding maximum unambiguous Doppler range decrease to 1/M of those of the SIMO radar. If an actual velocity exceeds the maximum unambiguous velocity range that may be measured by the MIMO radar, a measured velocity is ambiguous in this case. For example, if the maximum unambiguous velocity range of the MIMO radar is −2 m/s to 2 m/s, and if the actual velocity of the target object is 3 m/s, a velocity measured in an existing manner is −1 m/s, and the velocity measured by the MIMO radar is not the actual velocity. Therefore, velocity ambiguity resolving, that is, a process of obtaining the actual velocity of the target object needs to be performed.

Figure 7:
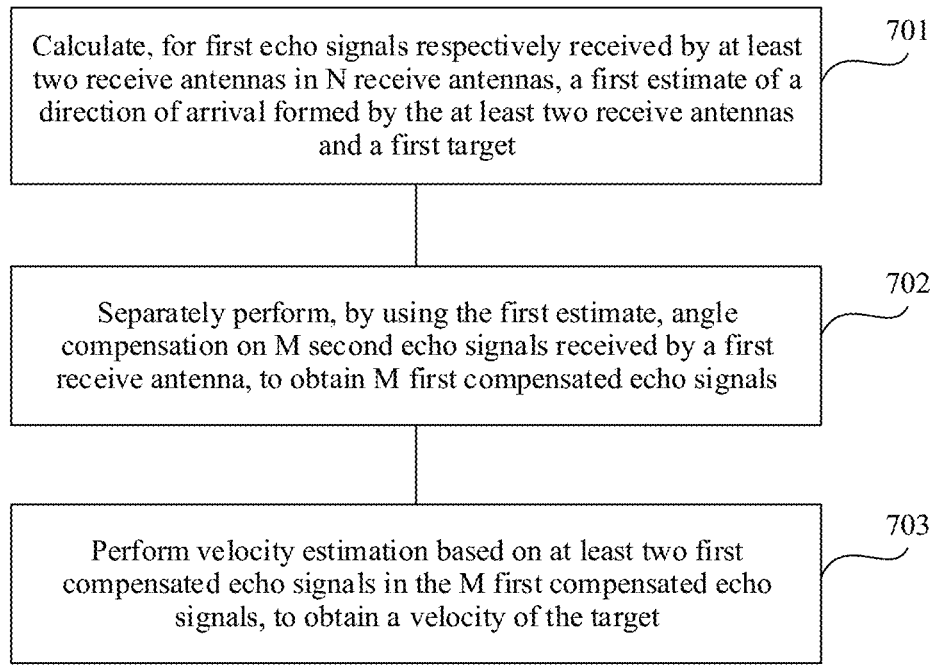
FIG. 7 is a schematic flowchart of a velocity ambiguity resolving method according to an embodiment of this application.

FIG. 7 is a schematic flowchart of a velocity ambiguity resolving method according to an embodiment of this application. The method is applied to a radar including M transmit antennas and N receive antennas, where M is an integer greater than 1, and N is an integer greater than 1. As shown in FIG. 7, the method includes the following steps.

Step 701: Calculate, for first echo signals respectively received by at least two receive antennas in the N receive antennas, a first estimate of a direction of arrival (DOA) formed by the at least two receive antennas and a first target.

The first echo signals are echo signals formed after transmit signals sent by a same transmit antenna are reflected by the first target. Herein, the transmit signals are the chirp signals in the foregoing embodiment.

For example, that a MIMO radar includes two transmit antennas (Tx1 and Tx2) and four receive antennas (which are respectively Rx1, Rx2, Rx3, and Rx4) is used as an example. Each receive antenna may receive an echo signal formed after a transmit signal transmitted by Tx1 is reflected by the first target, and may further receive an echo signal formed after a transmit signal transmitted by Tx2 is reflected by the first target. The first echo signals may be echo signals (which are referred to as, for example, first echo signals corresponding to Tx1) formed after transmit signals sent by Tx1 are reflected by the first target, or may be echo signals (which are referred to as, for example, first echo signals corresponding to Tx2) formed after transmit signals sent by Tx2 are reflected by the first target.

It should be noted that the direction of arrival may be an included angle between the target and a normal line of the receive antenna. In this embodiment of this application, it is considered that a direction of arrival formed by each of the N receive antennas and the first target is the same.

The first estimate of the direction of arrival may be determined based on echo signals formed after transmit signals transmitted by a same transmit antenna and received by different receive antennas are reflected by the first target. That is, using an example in which the first estimate of the direction of arrival may be determined based on first echo signals formed after transmit signals transmitted by Tx1 and respectively received by two receive antennas (Rx1 and Rx2) are reflected by the first target, the radar may determine the first estimate of the direction of arrival formed by the at least two receive antennas and the first target based on a first echo signal corresponding to Tx1 received by Rx1 and a first echo signal corresponding to Tx1 received by Rx2.

The following uses an example in which two receive antennas Rx1 and Rx2 respectively receive first echo signals corresponding to Tx1 to describe a principle of determining a direction of arrival formed by a receive antenna and the first target based on first echo signals received by different receive antennas.

Figure 8:
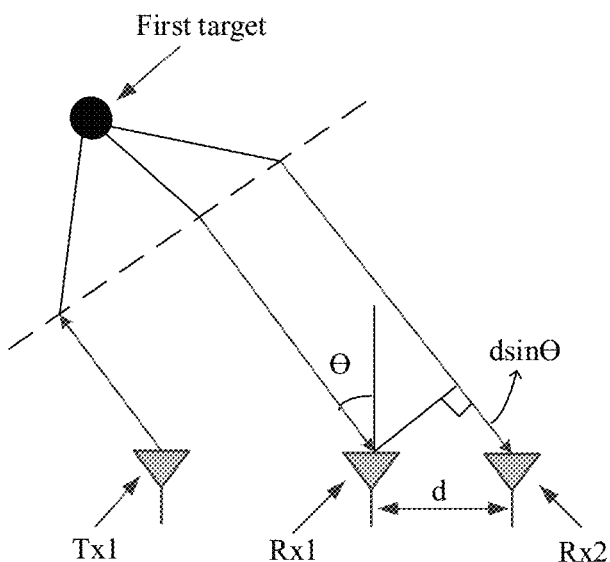
FIG. 8 is a schematic diagram of an angle measurement principle of a SIMO radar according to an embodiment of this application.

FIG. 8 is a schematic diagram of an angle measurement principle of a SIMO radar. In a far-field condition, as shown in FIG. 8, transmit signals transmitted by the transmit antenna Tx1 are respectively received by the two receive antennas Rx1 and Rx2 after being reflected by the first target. A phase difference between first echo signals corresponding to Tx1 received by the two receive antennas is ω, and a distance difference between distances respectively between the two receive antennas and the first target may be calculated based on the phase difference ω and a wavelength. The distance difference is dsinθ in FIG. 8, where d is a distance between the two receive antennas, and θ is an included angle (that is, a direction of arrival) between the first target and a normal line of the receive antenna. In this way, a value of θ, that is, the direction of arrival between the receive antenna and the first target may be calculated.

When a quantity of receive antennas is greater than 2, that the receive antennas are numbered in ascending order of distances from the transmit antenna is used as an example for description. A first receive antenna is used as a reference, and a phase shift of a first echo signal received by a receive antenna with a larger number is ω, relative to a first echo signal received by a previous receive antenna. Therefore, a phase of a first echo signal is linearly increased after the first echo signal passes through a plurality of receive antennas. Signals passing through the N receive antennas are sampled, so that a spectrum estimation method may be used to estimate ω and form an estimated angular spectrum (for example, an angle-dimensional FFT). Increasing the quantity of receive antennas forms an angular spectrum with a sharper peak, so that accuracy of angle estimation may be improved, thereby enhancing angular resolution.

Figure 9:
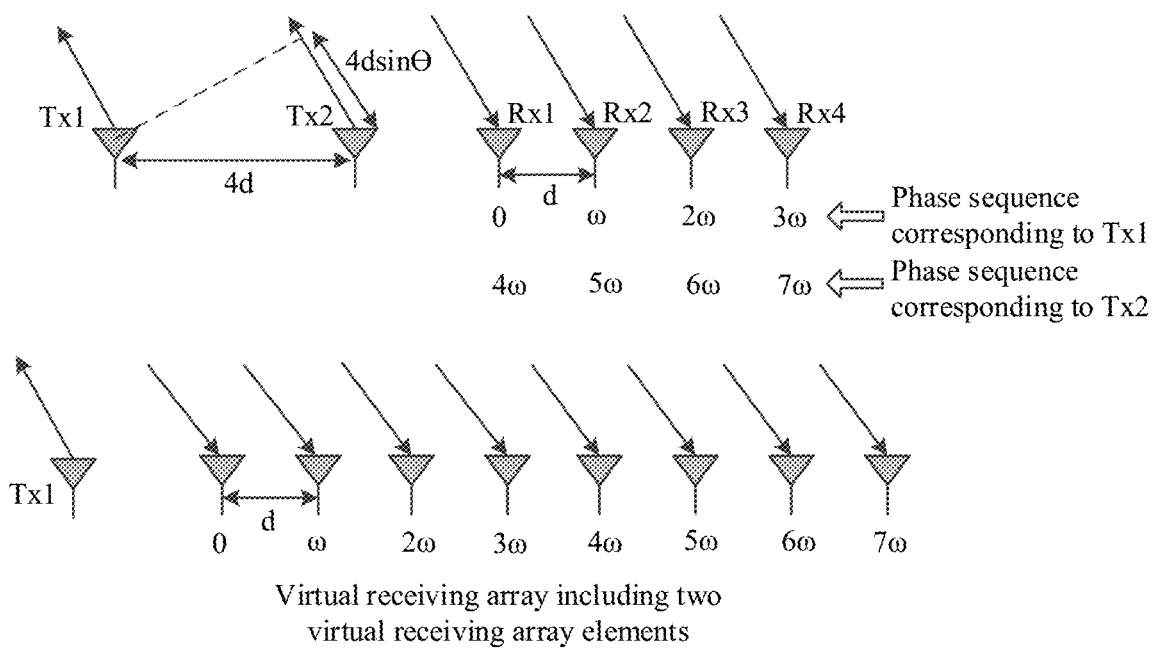
FIG. 9 is a schematic principle diagram of a virtual receiving array of a MIMO radar according to an embodiment of this application.

For a MIMO radar, the MIMO radar includes a plurality of transmit antennas and a plurality of receive antennas. FIG. 9 is a schematic principle diagram of a virtual receiving array of the MIMO radar.

As shown in FIG. 9, that the MIMO radar includes two transmit antennas (Tx1 and Tx2) and four receive antennas (Rx1, Rx2, Rx3, and Rx4) is used as an example. Phases corresponding to transmit signals that are transmitted by Tx1 and respectively received by Rx1, Rx2, Rx3, and Rx4 are [0, ω, 2ω, 3ω], and phases of first echo signals corresponding to transmit signals that are transmitted by Tx2 and respectively received by Rx1, Rx2, Rx3, and Rx4 are [4ω, 5ω, 6ω, 7ω]. Phase sequences of first echo signals corresponding to Tx1 and Tx2 respectively received by the four receive antennas are strung together to obtain a sequence [0, ω, 2ω, 3ω, 4ω, 5ω, 6ω, 7ω], which is equivalent to a phase sequence of one transmit antenna and eight receive antennas.

A signal currently received by each receive antenna is a signal superposed after a signal transmitted by a single transmit antenna is transmitted by the first target. Each receive antenna stores, based on transmit parameters for transmitting signals by a plurality of transmit antennas, signals that may be extracted from received signals and that are respectively from different transmit antennas and reflected by the first target, and the signals are used as received signals of a virtual receiving array element. The virtual receiving array element herein is an array element including one transmit antenna and a plurality of receive antennas. That is, the M transmit antennas and the N receive antennas correspond to received signals of M*N virtual receiving array elements.

In this embodiment of this application, one transmit antenna and the N receive antennas may implement one time of estimation on the direction of arrival, and the M transmit antennas and the N receive antennas may implement M times of estimation on the direction of arrival.

With reference to a specific example, the following describes an implementation process of how to determine the first estimate of the direction of arrival.

First, parameters that may be used in the following formula are described: In the formula, m represents an $m^{th}$ transmit antenna, n represents an $n^{th}$ receive antenna, k represents a $k^{th}$ chirp signal transmitted by the $m^{th}$ transmit antenna, $d_T$ represents a distance between adjacent transmit antennas, $d_R$ represents a distance between adjacent receive antennas, θ represents an angle (that is, a direction of arrival $θ_l$) formed by the first target and the receive antenna, and a is other correlatives such as a distance, an antenna gain, transmit power, and a wavelength in a radar equation. $(m-1)d_T+(n-1)d_R$ is a virtual array length corresponding to the $m^{th}$ transmit antenna and the $n^{th}$ receive antenna, and for an antenna array not uniformly arranged, a virtual array length corresponding to the antenna array may be equivalent to this term. ξ represents a velocity aliasing coefficient of the target, and T represents a transmitting cycle of a chirp signal. $f_{d,real}$ represents a real Doppler (Doppler) frequency of the target, and $f_{d,real}$ may be obtained by using formula (1):

$$f_{d,real} = f_d + 2\xi f_{d,max} \quad \text{Formula (1)}$$

$f_d$ represents a Doppler frequency estimate obtained from a range-Doppler map (RD map), and $\pm f_{d,max}$ represents a maximum Doppler range obtained from the RD map.

For a MIMO array radar of MTNR, a first echo signal received by an $n^{th}$ receive antenna included in the MIMO array radar may be represented as:

$$a(m, n, k, \theta, \xi) = \alpha \exp\left\{ j2\pi[(m-1)d_T + (n-1)d_R]\frac{\sin\theta}{\lambda} \right\} \quad \text{(Formula 2)}$$

$$\exp\{j2\pi f_{d,real}[(k-1)M + (m-1)T]\}$$

With reference to formula (1), formula (2) may alternatively be represented as:

$$a(m, n, k, \theta, \xi) = \alpha \exp\left\{ j2\pi[(m-1)d_T + (n-1)d_R]\frac{\sin\theta}{\lambda} \right\} \quad \text{(Formula 3)}$$

$$\exp\{j2\pi(f_d + 2\xi f_{d,max})[(k-1)M + (m-1)T]\}$$

To adapt to different antenna array layout modes, $(d_{Tm,Tref}+d_{Rn,Rref})$ may be equivalent to a virtual array length of the $m^{th}$ transmit antenna and the $n^{th}$ receive antenna, where $d_{Tm,Tref}$ represents a distance between the $m^{th}$ transmit antenna and a reference transmit antenna, and $d_{Rn,Rref}$ represents a distance between the $n^{th}$ receive antenna and a reference receive antenna (for example, the first receive antenna). For example, in an array layout mode in which the transmit antennas and the receive antennas are uniformly arranged, and when both the first transmit antenna and the first receive antenna are used as reference antennas, $(d_{Tm,Tref}+d_{Rn,Rref})$ may be used to separately replace $(m-1)d_T+(n-1)d_R$ in formula (2) and formula (3), and formula (2) may be represented as:

$$a(m, n, k, \theta, \xi) = \alpha \exp\left\{j2\pi(d_{Tm,Tref} + d_{Rn,Rref})\frac{\sin\theta}{\lambda}\right\} \quad \text{(Formula 4)}$$
$$\exp\{j2\pi f_{d,real}[(k-1)M + (m-1)T]\}$$

Formula (3) may be represented as:

$$a(m, n, k, \theta, \xi) = \alpha \exp\left\{j2\pi(d_{Tm,Tref} + d_{Rn,Rref})\frac{\sin\theta}{\lambda}\right\} \quad \text{(Formula 5)}$$
$$\exp\{j2\pi(f_d + 2\xi f_{d,max})[(k-1)M + (m-1)T]\}$$

For the MIMO radar, $d_{Tm,Tref}$ in first echo signals received by different receive antennas is a constant, and this constant is combined with $\alpha$ in formula (5) to obtain $\alpha_1$ in formula (6). That is, $d_{Tm,Tref}+d_{Rn,Rref}$ in formula (5) may be changed to $d_{Rn,Rref}$. That is, echo signals that are formed after transmit signals transmitted by a same transmit antenna m are reflected by the first target and that are received by different receive antennas may be represented as:

$$a(m, n, \theta, \xi) = \quad \text{(Formula 6)}$$
$$\alpha_1 \exp\left\{j2\pi d_{Rn,Rref}\frac{\sin\theta}{\lambda}\right\} \exp\{j2\pi(f_d + 2\xi f_{d,max})(m-1)T\}$$

It may be learned from formula (6) that the echo signals (that is, first echo signals) that are formed after the transmit signals transmitted by the same transmit antenna m are reflected by the first target and that are received by different receive antennas are a function of a direction of arrival (DOA) formed by the receive antennas and the target, and a term related to a velocity is a constant. Therefore, a first estimate of the direction of arrival may be obtained by performing angle estimation on phase information of the first echo signals received by the different receive antennas.

Specifically, based on formula (6), it may be obtained that a phase response vector of a one-dimensional linear array corresponding to first echo signals corresponding to a same transmit antenna respectively received by different receive antennas may be represented as:

$$a(\theta, \xi) = \left[\exp\left(j2\pi\frac{d_{R_1,Rref}\sin\theta}{\lambda}\right)\exp\left(j2\pi\frac{d_{R_2,Rref}\sin\theta}{\lambda}\right)\ldots \quad \text{(Formula 7)}\right.$$
$$\left.\exp\left(j2\pi\frac{d_{R_N,Rref}\sin\theta}{\lambda}\right)\right] * \exp\{j2\pi(f_d + 2\xi f_{d,max})(m-1)T\}$$

N represents a quantity of receive antenna array elements used during angle estimation, where $2 \leq N \leq N$, and m is a sequence number of a used transmit antenna. For example, N is 4, N is 4, and m is 2. That is, the first estimate of the direction of arrival is determined based on first echo signals corresponding to a transmit antenna 2 received by four receive antennas. The first echo signals corresponding to the transmit antenna 2 are echo signals formed after transmit signals transmitted by the transmit antenna 2 are reflected by the first target.

One-dimensional angle information $\theta$ of the first target, that is, the first estimate of the direction of arrival, may be obtained based on formula (7). Specifically, an angle estimation method such as FFT transform or digital beamforming (DBF) may be used to obtain the first estimate through estimation.

It should be noted that, when the first estimate of the direction of arrival is determined, for example, N is 4, and it may also be considered to determine the first estimate of the direction of arrival based on first echo signals corresponding to a plurality of transmit antennas respectively received by the four receive antennas, where the plurality of transmit antennas are respectively Tx1, Tx2, ..., and Txm. $\theta_1$ may be determined based on first echo signals corresponding to Tx1 respectively received by the four receive antennas, $\theta_2$ may be determined based on first echo signals corresponding to Tx2 respectively received by the four receive antennas, and so on, and $\theta_m$ may be determined based on first echo signals corresponding to Txm respectively received by the four receive antennas. Then, coherent accumulation is performed on the obtained angle values $\theta_1$, $\theta_2$, ..., and $\theta_m$ to obtain an angle value. Certainly, an estimate of the direction of arrival may alternatively be determined based on first echo signals corresponding to a plurality of transmit antennas respectively received by the four receive antennas, and this solution can improve estimation accuracy of an angle $\theta$, compared with determining the first estimate of the direction of arrival based on echo signals corresponding to one transmit antenna respectively received by a plurality of receive antennas.

Step 702: Separately perform, by using the first estimate, angle compensation on M second echo signals received by a first receive antenna, to obtain M first compensated echo signals.

The M second echo signals are echo signals formed after transmit signals transmitted by the M transmit antennas in a time division transmit mode are reflected by the target, and the first receive antenna is any one of the N receive antennas.

For example, that the MIMO radar includes two transmit antennas (Tx1 and Tx2) and four receive antennas (Rx1, Rx2, Rx3, and Rx4) is used as an example. The first receive antenna may be any one of Rx1, Rx2, Rx3, and Rx4.

The performing, by using the first estimate, angle compensation on M second echo signals received by a first receive antenna is described below.

For a same receive antenna (the first receive antenna) of the MIMO radar, a term $d_{Rn,Rref}$ in formula (7) is a constant term, and this constant term is extracted to $\alpha_2$ in formula (8). Therefore, $d_{Tm,Tref}+d_{Rn,Rref}$ in formula (7) may be changed to $d_{Tm,Tref}$. Therefore, echo signals (that is, second echo signals) that are formed after transmit signals transmitted by different transmit antennas are reflected by the first target and that are received by a same receive antenna may be represented as:

$$a(m, n, \theta_O, \xi) = \quad \text{(Formula 8)}$$

$$\alpha_2 \exp\left\{j2\pi d_{Tm,Tref}\frac{\sin\theta_O}{\lambda}\right\}\exp\{j2\pi(f_d + 2\xi f_{d,max})(m-1)T\}$$

It may be learned from formula (8) that the echo signals (that is, M second echo signals) that are formed after transmit signals transmitted by different transmit antennas are reflected by the target and that are received by the same receive antenna are a function of a direction of departure (DOD) $\theta_O$ and a velocity of the target.

Figure 10:
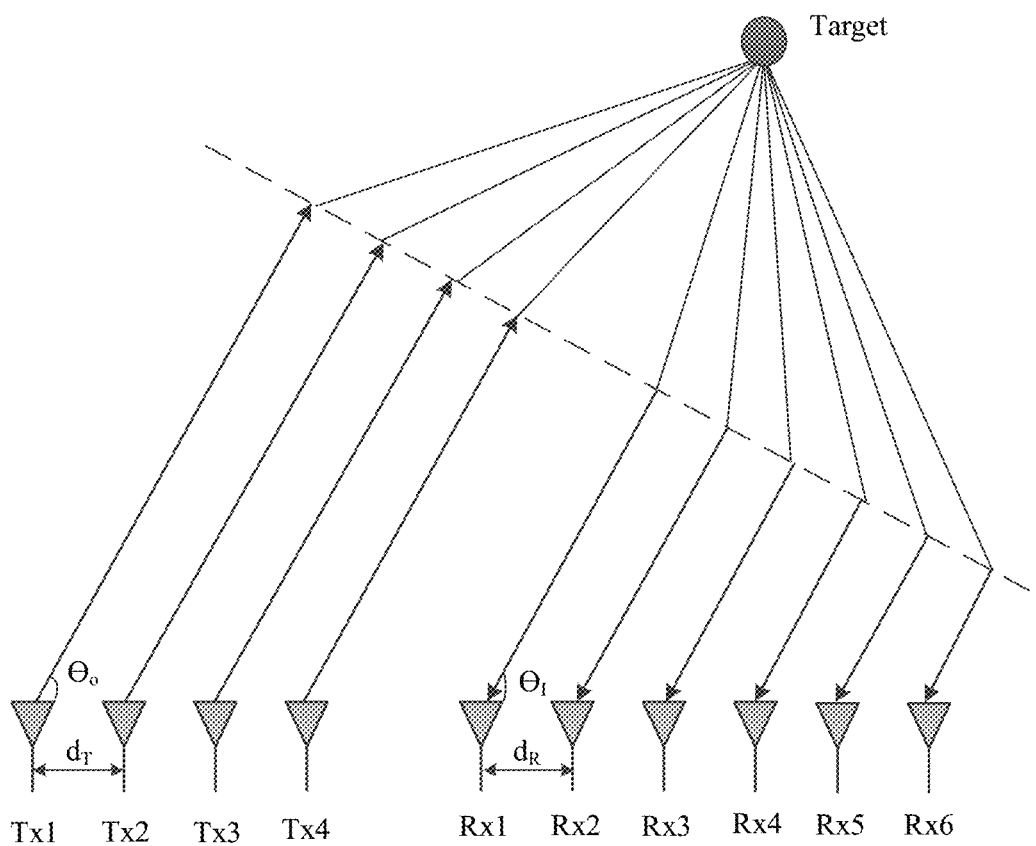
FIG. 10 is a schematic geometric diagram of observation of a far-field target according to an embodiment of this application.

For a far-field target, FIG. 10 is a schematic geometric diagram of observation of the far-field target. As shown in FIG. 10, the MIMO radar includes a transmit antenna array including four transmit antennas and a receive antenna array including six receive antennas. A direction of departure formed by the transmit antenna array and the target is $\theta_O$, and a direction of arrival formed by the receive antenna array and the target is $\theta_I$. When the target meets a far-field condition of antenna measurement, that is, when the target is far enough from the radar, $\theta_O$ and $\theta_I$ are equal, that is, both are $\theta$. For ease of description, a direction of departure (DOD) of a target signal and a direction of arrival (DOA) of the target signal are collectively referred to as the direction of arrival (DOA) in the following description.

Therefore, the direction of departure $\theta_O$ in formula (8) may be replaced with $\theta$. That is, a one-dimensional linear array corresponding to second echo signals corresponding to the M transmit antennas received by a same receive antenna may be represented as.

$$a_m(\theta, \xi) = \begin{bmatrix} \exp\left\{j2\pi\left(\frac{d_{T1,Tref}}{\lambda}\sin\theta\right)\right\}\exp\left\{j2\pi\left[\frac{d_{T2,Tref}}{\lambda}\sin\theta + (f_d + 2\xi f_{D,max})T\right]\right\} \cdots \\ \exp\left\{j2\pi\left[\frac{d_{TM,Tref}}{\lambda}\sin\theta + (M-1)(f_d + 2\xi f_{D,max})T\right]\right\} \end{bmatrix} \quad \text{(Formula 9)}$$

$\theta$ is a DOA angle of the target.

Further, the separately performing, by using the first estimate, angle compensation on M second echo signals received by a first receive antenna, to obtain M first compensated echo signals may include: constructing a first steering vector based on the first estimate and structural position information of an antenna array element of the radar apparatus, where the first steering vector includes angle information in the first echo signals corresponding to the M transmit antennas corresponding to the first target; and separately multiplying the M second echo signals by the first steering vector to obtain the M first compensated echo signals.

Specifically, the M first compensated echo signals are obtained by separately multiplying the M second echo signals by the first steering vector, and are specifically obtained by using the following formula (10):

$$\left[\exp\left\{j2\pi\frac{d_{T1,Tref}}{\lambda}\sin\theta\right\}, \exp\left\{j2\pi\left[\frac{d_{T2,Tref}}{\lambda}\sin\theta + (f_d + 2\xi f_{d,max})T\right]\right\},\right. \quad \text{(Formula 10)}$$

$$\left. \ldots, \exp\left\{j2\pi\left[\frac{d_{TM,Tref}}{\lambda}\sin\theta + (M-1)(f_d + 2\xi f_{d,max})T\right]\right\}\right]$$

$$\cdot\left[\exp\left(-j2\pi\frac{d_{T1,Rref}\sin\theta}{\lambda}\right), \exp\left(-j2\pi\frac{d_{T2,Rref}\sin\theta}{\lambda}\right), \ldots, \exp\left(-j2\pi\frac{d_{TM,Rref}\sin\theta}{\lambda}\right)\right]$$

• between a first term and a second term in formula (10) represents dot multiplication. The first term is the M echo signals, and the second term is the first steering vector.

Formula (10) may be simplified as formula (11), that is, Doppler information of a first compensated echo signal of a single target (that is, the first target):

$$a_m(\theta, \xi) = [1e\{j2\pi(f_d + 2\xi f_{D,max})T\} \ldots e\{j2\pi(M-1)(f_d + 2\xi f_{D,max})T\}] \quad \text{Formula (11)}$$

According to the foregoing example, a first estimate of a direction of arrival of the target may be obtained through estimation based on first echo signals corresponding to a same transmit antenna respectively received by different receive antennas, and then second echo signals corresponding to the M transmit antennas received by a same receive antenna are separately compensated by using the obtained first estimate, so that a phase effect caused by an angle may be eliminated. In this way, phase information corresponding to the second echo signals corresponding to the M transmit antennas received by the same receive antenna is a function of a velocity (or a Doppler frequency) of the target, as shown by formula (11). Then, velocity estimation is performed based on formula (11), so that the velocity of the target may be accurately estimated.

In some other embodiments, there may be a plurality of targets, that is, at least two receive antennas may receive a plurality of first echo signals that are corresponding to a same transmit antenna and that are reflected by the plurality of targets, and angle estimation may be separately performed, by using formula (7), for a first echo signal reflected by each target, to obtain a first estimate of a direction of arrival formed by each target and the receive antennas. For a specific implementation process of angle estimation, refer to related content of estimating the direction of arrival formed by the first target and the receive antennas. Details are not described herein.

The following uses two targets as an example. Angles $\theta_1$ and $\theta_2$ of the two targets and signal amplitudes $\alpha_{11}$ and $\alpha_{12}$ corresponding to the two targets may be separately estimated based on formula (7), and $m^{th}$ second echo signals that are respectively reflected by a plurality of targets and that are received by a same receive antenna (the first receive antenna) may be represented as:

$$a(m, n, \theta, \xi) = \tag{Formula 12}$$

$$\left\{ \alpha_{21} \exp\left\{ j2\pi \left[ d_{Tm,Tref} \frac{\sin\theta_1}{\lambda} + f_{d,real}(m-1)T \right] \right\} + \right.$$

$$\left. \alpha_{22} \exp\left\{ j2\pi \left[ d_{Tm,Tref} \frac{\sin\theta_2}{\lambda} + f_{d,real}(m-1)T \right] \right\} \right\}$$

$\alpha_{21}$ and $\alpha_{22}$ are amplitudes of received target signals. For a well calibrated radar system, for a same target, measurement amplitudes of different transmit/receive channels are the same. That is, $\alpha_{11}=\alpha_{21}$ and $\alpha_{12}=\alpha_{22}$. Assuming that $\alpha=\alpha_{11}\alpha_{12}=\alpha_{21}\alpha_{22}$, angle compensation is performed on formula (12) by using the estimated angles $\theta_1$ and $\theta_2$ of the targets and a layout position of an array, to obtain:

(Formula 13)

$$a(m, n, \theta, \xi) = \left\{ \alpha_{21} \exp\left\{ j2\pi \left[ d_{Tm,Tref} \frac{\sin\theta_1}{\lambda} + f_{d,real}(m-1)T \right] \right\} + \right.$$

$$\left. \alpha_{22} \exp\left\{ j2\pi \left[ d_{Tm,Tref} \frac{\sin\theta_2}{\lambda} + f_{d,real}(m-1)T \right] \right\} \right\}$$

$$\cdot \left\{ \frac{\alpha}{\alpha_{11}} \exp\left\{ -j2\pi d_{Tm,Tref} \frac{\sin\theta_1}{\lambda} \right\} + \frac{\alpha}{\alpha_{12}} \exp\left\{ -j2\pi d_{Tm,Tref} \frac{\sin\theta_2}{\lambda} \right\} \right\}$$

Formula (13) may be simplified as:

$$a(m, n, \theta, \xi) = 2\alpha \cos 2\pi d_{Tm,Tref} \frac{\sin\theta_1 - \sin\theta_2}{\lambda} e^{j\{2\pi f_{d,real}(m-1)T\}} + \tag{Formula 14}$$

$$(\alpha_{11}^2 + \alpha_{12}^2) e^{j2\pi f_{d,real}(m-1)T}$$

$$= \left[ 2\alpha \cos 2\pi d_{Tm,Tref} \frac{\sin\theta_1 - \sin\theta_2}{\lambda} + (\alpha_{11}^2 + \alpha_{12}^2) \right] e^{j2\pi f_{d,real}(m-1)T}$$

It may be learned from formula (14) that, for a fixed target, $$\left[ 2\alpha \cos 2\pi d_{Tm,Tref} \frac{\sin\theta_1 - \sin\theta_2}{\lambda} + (\alpha_{11}^2 + \alpha_{12}^2) \right]$$

is a constant term. Compensated echo signals of echo signals obtained after transmit signals that are transmitted by different transmit antennas and received by a same receive antenna are reflected by a target are related only to a velocity, so that velocity estimation may be performed.

Step 703: Perform velocity estimation based on at least two first compensated echo signals in the M first compensated echo signals, to obtain a velocity of the target.

For example, the MIMO radar includes four transmit antennas, that is, M is 4. Velocity estimation may be performed based on two first compensated echo signals received by one receive antenna, or velocity estimation may be performed based on three first compensated echo signals, or velocity estimation may be performed based on four first compensated echo signals.

In some other embodiments, the velocity of the target may be estimated based on second echo signals received by a plurality of receive antennas. Four receive antennas are used as an example. A velocity value may be obtained through estimation based on the second echo signals received by the plurality of receive antennas, to improve estimation accuracy of the velocity of the target. Specifically, FFT transform or a DBF manner may be used to estimate the velocity of the target.

In the foregoing solution, phase information of the M second echo signals received by the first receive antenna is related to an angle and a velocity, and in the solution, the M second echo signals received by the first receive antenna are compensated by using the first estimate of the direction of arrival, so that a phase effect caused by the angle may be eliminated. That is, the obtained first compensated echo signals are only related to the velocity. Then, velocity estimation is performed based on the first compensated echo signals that are only related to the velocity, and an estimated maximum unambiguous velocity range is equivalent to a velocity measurement range of a SIMO radar in a same cycle. In this way, a velocity of a target may be accurately estimated.

In addition, before the determining, based on first echo signals received by at least two receive antennas in the N receive antennas, a first estimate of a direction of arrival formed by the at least two receive antennas and a first target, M*N first range-Doppler maps corresponding to signals received by the N receive antennas may be further obtained, superposition processing may be performed on the M*N first range-Doppler maps to obtain a second range-Doppler map, and the first echo signals received by the at least two receive antennas may be determined from the second range-Doppler map. Performing superposition processing on the M*N first range-Doppler maps may help improve a signal-to-noise ratio during target detection, so that the target may be more accurately detected.

The obtaining M*N first range-Doppler maps corresponding to signals received by the N receive antennas may be specifically implemented in the following manner: for M first received signals received by each of the N receive antennas, performing range-dimensional Fourier transform or matched filtering, and performing Doppler-dimensional Fourier transform to obtain the M*N first range-Doppler maps (RD maps). The M first received signals are echo signals formed after signals transmitted by the M transmit antennas in the time division transmit mode are reflected by at least one target. Fourier transform or matched filtering may also be referred to as pulse compression.

In a possible implementation, the determining, from the second range-Doppler map, the first echo signals received by the at least two receive antennas may be implemented in the following manner: performing target detection processing on the second range-Doppler map to obtain a first position of the first target in the second range-Doppler map; determining M*N range-Doppler signals of the first target from the first position in the M*N first range-Doppler maps; and determining, from the M*N range-Doppler signals, the first echo signals received by the at least two receive antennas. Optionally, the target detection processing may be constant false alarm rate (CFAR) detection. In this way, the range-Doppler signals corresponding to the first target may be accurately determined from the M*N first range-Doppler maps, to accurately determine the signals used to estimate the direction of arrival of the first target.

Figures 11, 12:
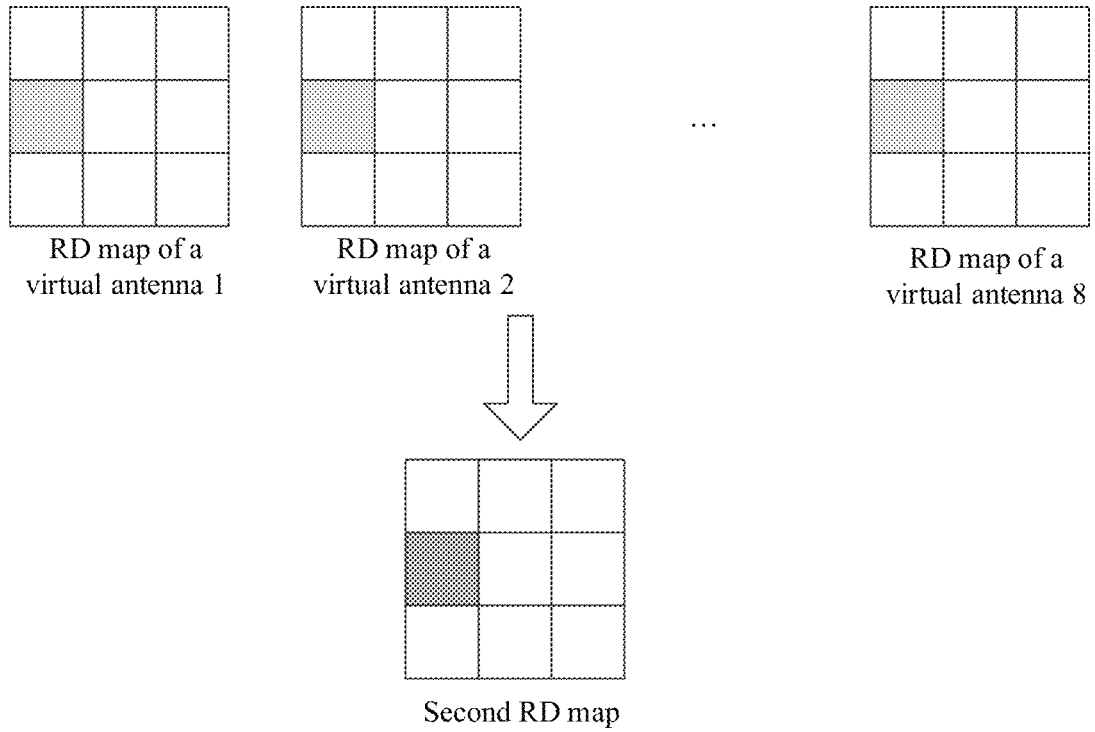
FIG. 11 is a schematic diagram of an RD map according to an embodiment of this application.
FIG. 12 is a schematic flowchart of a velocity ambiguity resolving method according to an embodiment of this application.

In an example, for example, M is 2, and N is 4. The first received signals are echo signals formed after signals transmitted by the two transmit antennas in the time division transmit mode are reflected by at least one target, and each of the four receive antennas may receive two first received signals. As shown in FIG. 11, eight first RD maps may be obtained, and superposition processing is performed on the eight first RD maps to obtain one second RD map. Then, constant false alarm rate (CFAR) detection is performed on the second RD map, to detect a position of the target, which is referred to as the first position. For example, the position of the target in FIG. 11 is the second row and the first column, that is, the first position. Then, a range-Doppler signal is determined from the first row and the first column in each of the eight first RD maps, that is, eight range-Doppler signals may be obtained in total, and the eight range-Doppler signals are respectively from the same position in the eight first RD maps. The eight range-Doppler signals include echo signals that are formed after transmit signals transmitted by the two transmit antennas are reflected by the target and that are received by each receive antenna. Therefore, the first echo signals received by the at least two receive antennas may be determined from the eight range-Doppler signals.

Optionally, there may be a plurality of implementations for performing superposition processing on the M*N first range-Doppler maps to obtain the second range-Doppler map.

Manner 1: Coherent superposition processing is performed on the M*N first range-Doppler maps to obtain the second range-Doppler map.

Manner 2: Incoherent superposition processing is performed on the M*N first range-Doppler maps to obtain the second range-Doppler map.

Manner 3: Half-coherent superposition processing is performed on the M*N first range-Doppler maps to obtain the second range-Doppler map.

Manner 3 may be implemented in the following manner: for each of the M transmit antennas, performing: determining, from the M*N first range-Doppler maps, at least two first range-Doppler maps corresponding to each transmit antenna; performing coherent superposition on the at least two first range-Doppler maps corresponding to each transmit antenna, to obtain a third range-Doppler map corresponding to each transmit antenna; and performing incoherent superposition processing on the third range-Doppler map corresponding to each of the M transmit antennas, to obtain the second range-Doppler map.

Further, performing coherent superposition processing on at least two first range-Doppler maps corresponding to a first transmit antenna, to obtain a third range-Doppler map corresponding to the transmit antenna may include but is not limited to several implementations provided below.

In a possible implementation, for a plurality of preset angles, each preset angle is used to separately compensate signals corresponding to each position in the at least two first range-Doppler maps corresponding to the first transmit antenna, to obtain at least two compensated first range-Doppler maps corresponding to each preset angle; and coherent superposition is performed on the at least two compensated first range-Doppler maps corresponding to each preset angle, to obtain third range-Doppler maps respectively corresponding to the plurality of preset angles.

Further, superposed signals respectively corresponding to the plurality of preset angles may be determined from a same position in the third range-Doppler maps respectively corresponding to the plurality of preset angles, and a first angle corresponding to a superposed signal with a largest energy value may be determined from the superposed signals respectively corresponding to the plurality of preset angles. Then, a first angle corresponding to a superposed signal with a largest energy value in superposed signals at the first position is used as the first estimate. In this way, an interval of a plurality of preset angles may be selected as required. For example, more preset angles may be detected in an angle range of interest, so that a more accurate direction of arrival may be estimated.

The separately compensating, by using each preset angle, signals corresponding to each position in the at least two first range-Doppler maps corresponding to the first transmit antenna, to obtain at least two compensated first range-Doppler maps corresponding to each preset angle may include: constructing a second steering vector based on each preset angle and structural position information of an antenna array element of the radar apparatus, where the second steering vector includes angle information in the first echo signals respectively received by the at least two receive antennas corresponding to the first target; and then multiplying the signals corresponding to each position in the at least two first range-Doppler maps corresponding to the first transmit antenna by the second steering vector, to obtain the at least two compensated first range-Doppler maps corresponding to each preset angle.

In another possible implementation, Fourier transform may be performed on signals at each position in the at least two first range-Doppler maps corresponding to the transmit antenna, to obtain the third range-Doppler map corresponding to the transmit antenna and a second angle corresponding to the signals at each position. Then, a second angle corresponding to signals at the first position is used as the first estimate.

In any one of manner 1 to manner 3, a signal-to-noise ratio during target detection may be improved, so that the target may be more accurately detected. That the MIMO radar includes M transmit antennas and N receive antennas is used as an example. For an effect of improving the signal-to-noise ratio, coherent superposition processing used by the MIMO radar may improve the signal-to-noise ratio by about M*N times compared with a single transmit mode, and incoherent superposition processing may improve the signal-to-noise ratio by about $\sqrt{M*N}$ times compared with the single transmit mode. An improvement effect of half-coherent superposition processing is between improvement effects of coherent superposition and incoherent superposition. However, in terms of computational complexity, computational complexity of coherent superposition processing is highest, and computational complexity of half-coherent superposition is between computational complexity of incoherent superposition and computational complexity of coherent superposition.

To further improve accuracy of velocity estimation, step 703 may further include the following steps: performing frequency estimation on the M first compensated echo signals to obtain a first Doppler frequency; performing, by using the first Doppler frequency, Doppler compensation on K third echo signals received by each receive antenna in a same measurement dimension, to obtain K second compensated echo signals corresponding to each receive antenna in the same measurement dimension, where the K third echo signals are echo signals formed after transmit signals transmitted by K transmit antennas in the time division transmit mode are reflected by the first target, K is a positive integer less than M, and the K transmit antennas and the receive antenna belong to the same measurement dimension; performing angle estimation based on the K second compensated echo signals to obtain a second estimate of the direction of arrival; and if an absolute value of a difference between the first estimate and the second estimate is less than or equal to a preset threshold, determining the velocity of the first target based on the first Doppler frequency.

The first estimate is obtained through estimation based on subarray information (first echo signals received by at least two receive antennas). An array element of a subarray is relatively short, and angular resolution is not high enough. Therefore, there may be an error in measurement of the first target. The second estimate is obtained through estimation based on information about a full array, angular resolution is high, and an accurate direction of arrival may be obtained. Therefore, when the absolute value of the difference between the first estimate and the second estimate is less than or equal to the preset threshold, it indicates that the first estimate used to compensate the second echo signals is relatively accurate, so that the velocity of the first target may be accurately estimated.

Further, after the performing angle estimation based on the K second compensated echo signals to obtain a second estimate of the direction of arrival, the method further includes: if the absolute value of the difference between the first estimate and the second estimate is greater than the preset threshold, performing, based on the second estimate, angle compensation on M second echo signals received by the same receive antenna, to obtain M third compensated echo signals; performing frequency estimation processing on the M third compensated echo signals to obtain a second Doppler frequency; performing, by using the second Doppler frequency, Doppler compensation on K third echo signals received by each receive antenna in a same measurement dimension, to obtain K fourth compensated echo signals corresponding to each receive antenna in the same measurement dimension; performing angle estimation based on the K fourth compensated echo signals to obtain a third estimate of the direction of arrival; and if an absolute value of a difference between the second estimate and the third estimate is less than or equal to the preset threshold, determining the velocity of the first target based on the second Doppler frequency.

When the absolute value of the difference between the first estimate and the second estimate is greater than the preset threshold, it indicates that the first estimate used to compensate the second echo signals is inaccurate, and then the second estimate obtained through estimation based on the information about the full array is used to compensate the third echo signals. Then, the velocity of the first target may be accurately estimated.

An embodiment of this application further provides another velocity ambiguity resolving method. The method may be applied to a radar apparatus including G groups of transmit antennas and N receive antennas, where the G groups of transmit antennas include M transmit antennas. The G groups of transmit antennas transmit signals in a time division transmit mode, and transmit antennas included in each group of transmit antennas transmit signals in a code division transmit mode. G and M are integers greater than 1, and N is a positive integer. Referring to FIG. 12, the method includes the following steps:

Step 1201: Calculate, for fourth echo signals received by at least two receive antennas in the N receive antennas, a fourth estimate of a direction of arrival formed by the receive antennas and a first target, where the fourth echo signals are echo signals formed after transmit signals sent by a same group of transmit antennas are reflected by the first target.

For how to determine the fourth estimate in step 1201, refer to related descriptions of determining the first estimate in FIG. 7. Details are not described herein.

Step 1202: Perform, based on the fourth estimate, angle compensation on M fifth echo signals received by a same receive antenna, to obtain M fifth compensated echo signals, where the M fifth echo signals are echo signals formed after transmit signals transmitted by the M transmit antennas are reflected by the first target.

For how to perform angle compensation on the M fifth echo signals based on the fourth estimate in step 1202, refer to related descriptions of performing angle compensation on the second echo signals based on the first estimate in FIG. 7. Details are not described herein.

Step 1203: Perform velocity estimation based on at least two fifth compensated echo signals in the M fifth compensated echo signals, to obtain a velocity of the first target.

For how to perform velocity estimation based on at least two fifth compensated echo signals in the M fifth compensated echo signals, to obtain the velocity of the first target in step 1203, refer to related descriptions of performing velocity estimation based on at least two first compensated echo signals in the M first compensated echo signals, to obtain the velocity of the first target in FIG. 7. Details are not described herein.

In this embodiment of this application, transmit signals transmitted by each group of transmit antennas are transmitted in a code division mode, that is, the transmit signals transmitted by the group of transmit antennas are transmitted at a same moment. It may be considered that transmit signals transmitted by the groups of transmit antennas are transmitted in the time division transmit mode. Therefore, in this embodiment of this application, an estimate of the direction of arrival, that is, the fourth estimate, may be determined based on echo signals that are formed after transmit signals transmitted by a same group of transmit antennas are reflected by the first target and that are received by at least two receive antennas. The M fifth echo signals are related to an angle and a velocity, and the M fifth echo signals are compensated by using the fourth estimate, so that a phase effect caused by the angle may be eliminated. That is, the obtained fifth compensated echo signals are only related to the velocity. Then, velocity estimation is performed based on the fifth compensated echo signals that are only related to the velocity, and an estimated maximum unambiguous velocity range is equivalent to a velocity measurement range of a SIMO radar in a same cycle. In this way, a velocity of a target may be accurately estimated.

The foregoing mainly describes the solutions provided in the embodiments of this application. It may be understood that, to implement the foregoing functions, a radar apparatus may include corresponding hardware structures and/or software modules for performing the functions. A person skilled in the art should be easily aware that, in combination with units and algorithm steps of the examples described in the embodiments disclosed in this specification, the embodiments of this application may be implemented by hardware or a combination of hardware and computer software. Whether a function is performed by hardware or hardware driven by computer software depends on a particular application and a design constraint condition of the technical solutions. A person skilled in the art may use different methods to implement the described functions for each particular application, but it should not be considered that the implementation goes beyond the scope of this application.

Figure 13:
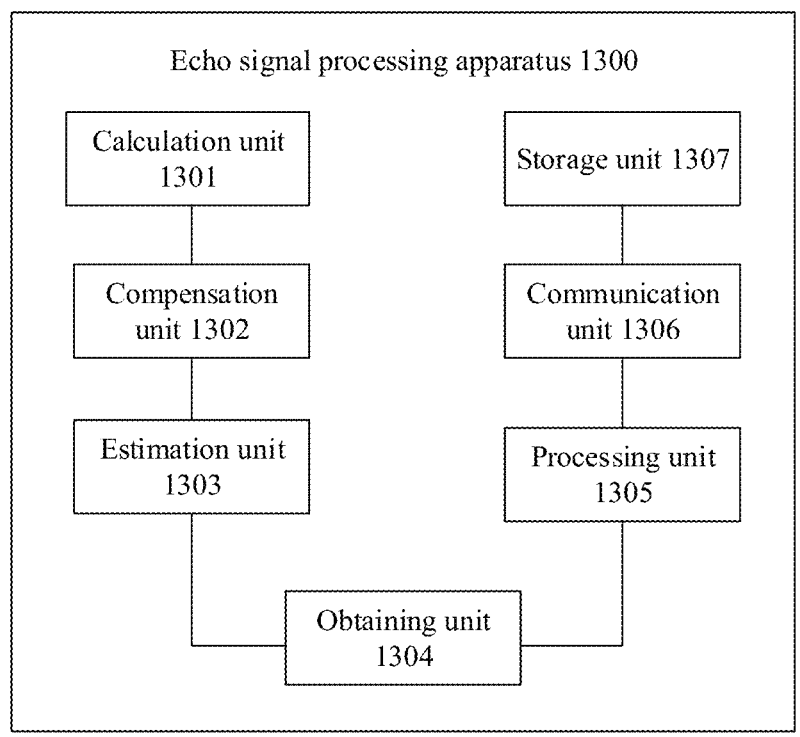
FIG. 13 is a schematic diagram of a hardware structure of a radar apparatus according to an embodiment of this application.

When an integrated unit (module) is used, FIG. 13 shows a possible example block diagram of an echo signal processing apparatus in an embodiment of this application. The echo signal processing apparatus 1300 may include a calculation unit 1301, a compensation unit 1302, and an estimation unit 1303, and optionally, may further include an obtaining unit 1304 and a processing unit 1305.

Further, in an example, the radar apparatus 1300 may be a semiconductor chip disposed in a radar. In this case, specific functions of the calculation unit 1301, the compensation unit 1302, the estimation unit 1303, the obtaining unit 1304, and the processing unit 1305 may be implemented by a processor (for example, a baseband processor).

In another example, the echo signal processing apparatus 1300 may be a radar. In this case, the echo signal processing apparatus 1300 may further include a communication unit 1306 and a storage unit 1307. The calculation unit 1301, the compensation unit 1302, the estimation unit 1303, the obtaining unit 1304, and the processing unit 1305 may be integrated into a processing unit, which is configured to control and manage an action of the echo signal processing apparatus 1300. The communication unit 1306 is also referred to as a transceiver unit, which may include a receiving unit and/or a sending unit, respectively configured to perform a receiving operation and a sending operation. The storage unit 1307 is configured to store program code and/or data of the echo signal processing apparatus 1300. Specifically, the processing unit may be a processor, and the processing unit may implement or execute various example logical blocks, modules, and circuits described with reference to content disclosed in this embodiment of this application. The communication unit 1306 may be a communication interface, a transceiver, a transceiver circuit, or the like. The communication interface is a general name, and may include a plurality of interfaces during specific implementation. The storage unit 1307 may be a memory.

In this embodiment of this application, units such as the calculation unit 1301, the compensation unit 1302, the estimation unit 1303, the obtaining unit 1304, and the processing unit 1305 may support the echo signal processing apparatus 1300 in performing the actions in the foregoing method examples. For example, the calculation unit 1301 is configured to perform step 701 in FIG. 7, the compensation unit 1302 is configured to perform step 702 in FIG. 7, and the estimation unit 1303 is configured to perform step 703 in FIG. 7.

Specifically, in an embodiment, the echo signal processing apparatus 1300 is coupled to M transmit antennas and N receive antennas, where M is an integer greater than 1, and N is an integer greater than 1. The echo signal processing apparatus 1300 may include:

a calculation unit 1301, configured to calculate, for first echo signals respectively received by at least two receive antennas in the N receive antennas, a first estimate of a direction of arrival formed by the at least two receive antennas and a first target, where the first echo signals are echo signals formed after transmit signals sent by a same transmit antenna are reflected by the first target; a compensation unit 1302, configured to separately perform, by using the first estimate, angle compensation on M second echo signals received by a first receive antenna, to obtain M first compensated echo signals, where the M second echo signals are echo signals formed after transmit signals transmitted by the M transmit antennas in a time division transmit mode are reflected by the first target, and the first receive antenna is any one of the N receive antennas; and an estimation unit 1303, configured to perform velocity estimation based on at least two first compensated echo signals in the M first compensated echo signals, to obtain a velocity of the first target.

In a possible design, the compensation unit 1302 is specifically configured to: construct a first steering vector based on the first estimate and structural position information of an antenna array element of a radar apparatus, where the first steering vector includes angle information in the first echo signals corresponding to the M transmit antennas corresponding to the first target; and separately multiply the M second echo signals by the first steering vector to obtain the M first compensated echo signals.

In a possible design, the compensation unit 1302 is specifically configured to obtain the M first compensated echo signals by using the following formula:

$$\left[\exp\left\{j2\pi\frac{d_{T1,Tref}}{\lambda}\sin\theta\right\}, \exp\left\{j2\pi\left[\frac{d_{T2,Tref}}{\lambda}\sin\theta + (f_d + 2\xi f_{d,max})T\right]\right\}, \right.$$
$$\left. \ldots, \exp\left\{j2\pi\left[\frac{d_{TM,Tref}}{\lambda}\sin\theta + (M-1)(f_d + 2\xi f_{d,max})T\right]\right\}\right]$$
$$\cdot\left[\exp\left(-j2\pi\frac{d_{T_1,Rref}\sin\theta}{\lambda}\right), \right.$$
$$\left. \exp\left(-j2\pi\frac{d_{T_2,Rref}\sin\theta}{\lambda}\right), \ldots, \exp\left(-j2\pi\frac{d_{TM,Rref}\sin\theta}{\lambda}\right)\right],$$

where • represents dot multiplication.

$d_{Tm,Tref}$ represents a distance between an $m^{th}$ transmit antenna and a reference transmit antenna, where m is all integers from 1 to M; θ represents the direction of arrival formed by the at least two receive antennas and the first target; $f_d+2\xi f_{d,max}$ may also be represented as $f_{d,real}$, that is, a real Doppler frequency of the first target, where $f_d$ represents a Doppler frequency estimate of the first target, and represents a velocity aliasing coefficient of the first target; N represents a quantity of receive antenna array elements used in estimating the direction of arrival, where N meets 2≤N≤N; $d_{Rn,Ref}$ represents a distance between an $n^{th}$ receive antenna and a reference receive antenna, where n is all integers from 1 to N.

In a possible design, the echo signal processing apparatus further includes an obtaining unit 1304 and a processing unit 1305. The obtaining unit 1304 is configured to obtain M*N first range-Doppler maps corresponding to signals received by the N receive antennas. The processing unit 1305 is configured to perform superposition processing on the M*N first range-Doppler maps to obtain a second range-Doppler map; and determine, from the second range-Doppler map, the first echo signals received by the at least two receive antennas.

In a possible design, the processing unit 1305 is specifically configured to: perform target detection on the second range-Doppler map to obtain a first position of the first target in the second range-Doppler map; determine M*N range-Doppler signals of the first target from the first position in the M*N first range-Doppler maps; and determine, from the M*N range-Doppler signals, the first echo signals received by the at least two receive antennas.

In a possible design, the superposition processing includes any one of the following: coherent superposition, incoherent superposition, or half-coherent superposition.

In a possible design, the processing unit 1305 is specifically configured to: for each of the M transmit antennas, perform: determining, from the M*N first range-Doppler maps, at least two first range-Doppler maps corresponding to each transmit antenna; performing coherent superposition on the at least two first range-Doppler maps corresponding to each transmit antenna, to obtain a third range-Doppler map corresponding to each transmit antenna; and performing incoherent superposition processing on the third range-Doppler map corresponding to each of the M transmit antennas, to obtain the second range-Doppler map.

In a possible design, the compensation unit 1302 is specifically configured to: for a plurality of preset angles, separately compensate, by using each preset angle, signals corresponding to each position in the at least two first range-Doppler maps corresponding to the first transmit antenna, to obtain at least two compensated first range-Doppler maps corresponding to each preset angle. The processing unit 1305 is specifically configured to: perform coherent superposition on the at least two compensated first range-Doppler maps corresponding to each preset angle, to obtain third range-Doppler maps respectively corresponding to the plurality of preset angles; determine, from a same position in the third range-Doppler maps respectively corresponding to the plurality of preset angles, superposed signals respectively corresponding to the plurality of preset angles, and determine, from the superposed signals respectively corresponding to the plurality of preset angles, a first angle corresponding to a superposed signal with a largest energy value; and use a first angle corresponding to a superposed signal with a largest energy value in superposed signals at the first position as the first estimate.

In a possible design, the compensation unit 1302 is specifically configured to: construct a second steering vector based on each preset angle and structural position information of an antenna array element of the echo signal processing apparatus, where the second steering vector includes angle information in the first echo signals respectively received by the at least two receive antennas corresponding to the first target; and multiply the signals corresponding to each position in the at least two first range-Doppler maps corresponding to the first transmit antenna by the second steering vector, to obtain the at least two compensated first range-Doppler maps corresponding to each preset angle.

In a possible design, the processing unit 1305 is specifically configured to: perform Fourier transform on signals at each position in the at least two first range-Doppler maps corresponding to the transmit antenna, to obtain the third range-Doppler map corresponding to the transmit antenna and a second angle corresponding to the signals at each position; and use a second angle corresponding to signals at the first position as the first estimate.

In a possible design, the estimation unit 1303 is specifically configured to perform frequency estimation on the M first compensated echo signals to obtain a first Doppler frequency. The compensation unit 1302 is specifically configured to perform, by using the first Doppler frequency, Doppler compensation on K third echo signals received by each receive antenna in a same measurement dimension, to obtain K second compensated echo signals corresponding to each receive antenna in the same measurement dimension, where the K third echo signals are echo signals formed after transmit signals transmitted by K transmit antennas in the time division transmit mode are reflected by the first target, the K transmit antennas and the receive antenna belong to the same measurement dimension, and K is a positive integer less than N. The estimation unit 1303 is further configured to perform angle estimation based on the K second compensated echo signals to obtain a second estimate of the direction of arrival. The processing unit 1305 is configured to: if an absolute value of a difference between the first estimate and the second estimate is less than or equal to a preset threshold, determine the velocity of the first target based on the first Doppler frequency.

In a possible design, the compensation unit 1302 is further configured to: if the absolute value of the difference between the first estimate and the second estimate is greater than the preset threshold, perform, based on the second estimate, angle compensation on M second echo signals received by the same receive antenna, to obtain M third compensated echo signals. The estimation unit 1303 is further configured to perform frequency estimation processing on the M third compensated echo signals to obtain a second Doppler frequency. The compensation unit 1302 is further configured to perform, by using the second Doppler frequency, Doppler compensation on K third echo signals received by each receive antenna in a same measurement dimension, to obtain K fourth compensated echo signals corresponding to each receive antenna in the same measurement dimension. The estimation unit 1303 is further configured to perform angle estimation based on the K fourth compensated echo signals to obtain a third estimate of the direction of arrival. The processing unit 1305 is further configured to: if an absolute value of a difference between the second estimate and the third estimate is less than or equal to the preset threshold, determine the velocity of the first target based on the second Doppler frequency.

Specifically, in another embodiment, the echo signal processing apparatus 1300 is coupled to G groups of transmit antennas and N receive antennas, where the G groups of transmit antennas include M transmit antennas. The G groups of transmit antennas transmit signals in a time division transmit mode, and transmit antennas included in each group of transmit antennas transmit signals in a code division transmit mode. G and M are integers greater than 1, and N is a positive integer. The echo signal processing apparatus includes:

a calculation unit 1301, configured to calculate, for fourth echo signals received by at least two receive antennas in the N receive antennas, a fourth estimate of a direction of arrival formed by the receive antennas and a first target, where the fourth echo signals are echo signals formed after transmit signals sent by a same group of transmit antennas are reflected by the first target;

a compensation unit 1302, configured to perform, based on the fourth estimate, angle compensation on M fifth echo signals received by a same receive antenna, to obtain M fifth compensated echo signals, where the M fifth echo signals are echo signals formed after transmit signals transmitted by the M transmit antennas are reflected by the first target; and an estimation unit 1303, configured to perform velocity estimation based on at least two fifth compensated echo signals in the M fifth compensated echo signals, to obtain a velocity of the first target.

It should be noted that, in the embodiments of this application, division into units (modules) is an example, and is merely division into logical functions. In actual implementation, another division manner may be used. Functional modules in the embodiments of this application may be integrated into one processing module, or each of the modules may exist alone physically, or two or more modules are integrated into one module. The integrated module may be implemented in a form of hardware, or may be implemented in a form of a software functional module.

When the integrated module is implemented in the form of a software functional module and sold or used as an independent product, the integrated module may be stored in a computer-readable storage medium. Based on such an understanding, the technical solutions of the embodiments of this application essentially, or the part contributing to the conventional technology, or all or some of the technical solutions may be implemented in a form of a software product. The computer software product is stored in a storage medium, and includes several instructions for instructing a computer device (which may be a personal computer, a server, a network device, or the like) or a processor to perform all or some of the steps of the methods in the embodiments of this application. The foregoing storage medium may be any medium that can store program code, such as a memory.

All or some of the foregoing embodiments may be implemented by using software, hardware, firmware, or any combination thereof. When software is used to implement the embodiments, all or some of the foregoing embodiments may be implemented in a form of a computer program product. The computer program product includes one or more computer instructions. When the computer program instructions are loaded and executed on a computer, the procedure or functions according to the embodiments of the present invention are all or partially generated. The computer may be a general purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk drive, or a magnetic tape), an optical medium (for example, a DVD), a semiconductor medium (for example, a solid-state drive (SSD)), or the like.

The embodiments of the present invention are described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. The computer program instructions may be provided for a general purpose computer, a dedicated computer, an embedded processor, or a processor of another programmable data processing device to generate a machine, so that the instructions executed by a computer or a processor of another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A velocity ambiguity resolving method, applied to a radar apparatus comprising M transmit antennas and N receive antennas, wherein M is an integer greater than 1, N is an integer greater than 1, and the method comprises:

determining, for first echo signals respectively received by at least two receive antennas in the N receive antennas, a first estimate of a direction of arrival formed by the at least two receive antennas and a first target, wherein the first echo signals are echo signals formed after transmit signals sent by a same transmit antenna are reflected by the first target;

separately performing, by using the first estimate, angle compensation on M second echo signals received by a first receive antenna, to obtain M first compensated echo signals, wherein the M second echo signals are echo signals formed after transmit signals transmitted by the M transmit antennas in a time division transmit mode are reflected by the first target, and the first receive antenna is any one of the N receive antennas;

performing velocity estimation based on at least two first compensated echo signals in the M first compensated echo signals, to obtain a velocity of the first target; and wherein before determining the first estimate of the direction of arrival formed by the at least two receive antennas and the first target, the method further comprises:
obtaining M*N first range-Doppler maps corresponding to signals received by the N receive antennas;
performing superposition processing on the M*N first range-Doppler maps to obtain a second range-Doppler map, including:
for each of the M transmit antennas, performing:
determining, from the M*N first range-Doppler maps, at least two first range-Doppler maps corresponding to each transmit antenna;
performing coherent superposition on the at least two first range-Doppler maps corresponding to each transmit antenna, to obtain a third range-Doppler map corresponding to each transmit antenna; and
performing incoherent superposition processing on the third range-Doppler map corresponding to each of the M transmit antennas, to obtain the second range-Doppler map.

2. The method according to claim 1, wherein the separately performing the angle compensation on the M second echo signals received by the first receive antenna, to obtain the M first compensated echo signals comprises:
constructing a first steering vector based on the first estimate and structural position information of an antenna array element of the radar apparatus, wherein the first steering vector comprises angle information in the first echo signals corresponding to the M transmit antennas corresponding to the first target; and
separately multiplying the M second echo signals by the first steering vector to obtain the M first compensated echo signals.

3. The method according to claim 1, wherein before determining the first estimate of the direction of arrival formed by the at least two receive antennas and the first target, the method further comprises:
determining, from the second range-Doppler map, the first echo signals received by the at least two receive antennas.

4. The method according to claim 3, wherein the determining the first echo signals received by the at least two receive antennas comprises:
performing target detection on the second range-Doppler map to obtain a first position of the first target in the second range-Doppler map;
determining M*N range-Doppler signals of the first target from the first position in the M*N first range-Doppler maps; and
determining, from the M*N range-Doppler signals, the first echo signals received by the at least two receive antennas.

5. The method according to claim 3, wherein the superposition comprises any one of the following:
coherent superposition, incoherent superposition, or half-coherent superposition.

6. The method according to claim 1, wherein the performing the coherent superposition on the at least two first range-Doppler maps corresponding to a first transmit antenna, to obtain the third range-Doppler map corresponding to the first transmit antenna comprises:
for a plurality of preset angles, separately compensating, by using each preset angle, signals corresponding to each position in the at least two first range-Doppler maps corresponding to the first transmit antenna, to obtain at least two compensated first range-Doppler maps corresponding to each preset angle; and performing coherent superposition on the at least two compensated first range-Doppler maps corresponding to each preset angle, to obtain third range-Doppler maps respectively corresponding to the plurality of preset angles; and
determining, from a same position in the third range-Doppler maps respectively corresponding to the plurality of preset angles, superposed signals respectively corresponding to the plurality of preset angles, and determining, from the superposed signals respectively corresponding to the plurality of preset angles, a first angle corresponding to a superposed signal with a largest energy value; and
wherein the determining the first estimate of the direction of arrival formed by the receive antennas and the first target comprises:
using a first angle corresponding to a superposed signal with a largest energy value in superposed signals at a first position as the first estimate.

7. The method according to claim 6, wherein the separately compensating the signals corresponding to each position in the at least two first range-Doppler maps corresponding to the first transmit antenna, to obtain the at least two compensated first range-Doppler maps corresponding to each preset angle comprises:
constructing a second steering vector based on each preset angle and structural position information of an antenna array element of the radar apparatus, wherein the second steering vector comprises angle information in the first echo signals respectively received by the at least two receive antennas corresponding to the first target; and
multiplying the signals corresponding to each position in the at least two first range-Doppler maps corresponding to the first transmit antenna by the second steering vector, to obtain the at least two compensated first range-Doppler maps corresponding to each preset angle.

8. The method according to claim 1, wherein the performing the coherent superposition on the at least two first range-Doppler maps corresponding to a transmit antenna, to obtain the third range-Doppler map corresponding to the transmit antenna comprises:
performing Fourier transform on signals at each position in the at least two first range-Doppler maps corresponding to the transmit antenna, to obtain the third range-Doppler map corresponding to the transmit antenna and a second angle corresponding to the signals at each position; and
wherein the determining the first estimate of the direction of arrival formed by the receive antennas and the first target comprises:
using a second angle corresponding to signals at a first position as the first estimate.

9. The method according to claim 1, wherein the performing the velocity estimation based on the at least two first compensated echo signals in the M first compensated echo signals, to obtain the velocity of the first target comprises:
performing frequency estimation on the M first compensated echo signals to obtain a first Doppler frequency;
performing, by using the first Doppler frequency, Doppler compensation on K third echo signals received by each receive antenna in a same measurement dimension, to obtain K second compensated echo signals corresponding to each receive antenna in the same measurement dimension, wherein the K third echo signals are echo signals formed after transmit signals transmitted by K transmit antennas in the time division transmit mode are reflected by the first target, the K transmit antennas and the receive antenna belong to the same measurement dimension, and K is a positive integer less than N;

performing angle estimation based on the K second compensated echo signals to obtain a second estimate of the direction of arrival; and in response to an absolute value of a difference between the first estimate and the second estimate being less than or equal to a preset threshold, determining the velocity of the first target based on the first Doppler frequency.

10. The method according to claim 9, wherein after performing the angle estimation based on the K second compensated echo signals to obtain the second estimate of the direction of arrival, the method further comprises:

in response to the absolute value of the difference between the first estimate and the second estimate being greater than the preset threshold, performing, based on the second estimate, angle compensation on M second echo signals received by the same receive antenna, to obtain M third compensated echo signals;

performing frequency estimation processing on the M third compensated echo signals to obtain a second Doppler frequency;

performing, by using the second Doppler frequency, Doppler compensation on K third echo signals received by each receive antenna in a same measurement dimension, to obtain K fourth compensated echo signals corresponding to each receive antenna in the same measurement dimension;

performing angle estimation based on the K fourth compensated echo signals to obtain a third estimate of the direction of arrival; and in response to an absolute value of a difference between the second estimate and the third estimate being less than or equal to the preset threshold, determining the velocity of the first target based on the second Doppler frequency.

11. A velocity ambiguity resolving method, applied to a radar apparatus comprising G groups of transmit antennas and N receive antennas, wherein the G groups of transmit antennas comprise M transmit antennas, the G groups of transmit antennas transmit signals in a time division transmit mode, transmit antennas comprised in each group of transmit antennas transmit signals in a code division transmit mode, both G and M are integers greater than 1, N is an integer greater than 1, and the method comprises:

determining, based on fourth echo signals received by at least two receive antennas in the N receive antennas, a fourth estimate of a direction of arrival formed by the receive antennas and a first target, wherein the fourth echo signals are echo signals formed after transmit signals sent by a same group of transmit antennas are reflected by the first target;

performing, based on the fourth estimate, angle compensation on M fifth echo signals received by a same receive antenna, to obtain M fifth compensated echo signals, wherein the M fifth echo signals are echo signals formed after transmit signals transmitted by the M transmit antennas are reflected by the first target; and performing velocity estimation based on at least two fifth compensated echo signals in the M fifth compensated echo signals, to obtain a velocity of the first target.

12. An echo signal processing apparatus, coupled to M transmit antennas and N receive antennas, wherein M is an integer greater than 1, N is an integer greater than 1, and the echo signal processing apparatus comprises:

a processor; and a memory coupled to the processor and having processor-executable instructions stored thereon, which are executed by the processor and cause the apparatus to perform operations including:

determining, for first echo signals respectively received by at least two receive antennas in the N receive antennas, a first estimate of a direction of arrival formed by the at least two receive antennas and a first target, wherein the first echo signals are echo signals formed after transmit signals sent by a same transmit antenna are reflected by the first target;

separately performing, by using the first estimate, angle compensation on M second echo signals received by a first receive antenna, to obtain M first compensated echo signals, wherein the M second echo signals are echo signals formed after transmit signals transmitted by the M transmit antennas in a time division transmit mode are reflected by the first target, and the first receive antenna is any one of the N receive antennas;

performing velocity estimation based on at least two first compensated echo signals in the M first compensated echo signals, to obtain a velocity of the first target; and wherein before determining the first estimate of the direction of arrival formed by the at least two receive antennas and the first target, the operations further comprise:

obtaining M*N first range-Doppler maps corresponding to signals received by the N receive antennas;

performing superposition processing on the M*N first range-Doppler maps to obtain a second range-Doppler map, including:

for each of the M transmit antennas, performing:

determining, from the M*N first range-Doppler maps, at least two first range-Doppler maps corresponding to each transmit antenna;

performing coherent superposition on the at least two first range-Doppler maps corresponding to each transmit antenna, to obtain a third range-Doppler map corresponding to each transmit antenna; and performing incoherent superposition processing on the third range-Doppler map corresponding to each of the M transmit antennas, to obtain the second range-Doppler map.

13. The echo signal processing apparatus according to claim 12, wherein the operations further include:

constructing a first steering vector based on the first estimate and structural position information of an antenna array element of a radar apparatus, wherein the first steering vector comprises angle information in the first echo signals corresponding to the M transmit antennas corresponding to the first target; and separately multiplying the M second echo signals by the first steering vector to obtain the M first compensated echo signals.

14. The echo signal processing apparatus according to claim 12, wherein the operations further include:

determining, from the second range-Doppler map, the first echo signals received by the at least two receive antennas.

15. The echo signal processing apparatus according to claim 14, wherein the operations further include:

performing target detection on the second range-Doppler map to obtain a first position of the first target in the second range-Doppler map;

determining M*N range-Doppler signals of the first target from the first position in the M*N first range-Doppler maps; and determining, from the M*N range-Doppler signals, the first echo signals received by the at least two receive antennas.

16. The echo signal processing apparatus according to claim 14, wherein the superposition processing comprises any one of the following:

coherent superposition, incoherent superposition, or half-coherent superposition.

17. The echo signal processing apparatus according to claim 12, wherein the operations further include:

for a plurality of preset angles, separately compensate, by using each preset angle, signals corresponding to each position in the at least two first range-Doppler maps corresponding to a first transmit antenna, to obtain at least two compensated first range-Doppler maps corresponding to each preset angle; and performing coherent superposition on the at least two compensated first range-Doppler maps corresponding to each preset angle, to obtain third range-Doppler maps respectively corresponding to the plurality of preset angles;

determining, from a same position in the third range-Doppler maps respectively corresponding to the plurality of preset angles, superposed signals respectively corresponding to the plurality of preset angles, and determining, from the superposed signals respectively corresponding to the plurality of preset angles, a first angle corresponding to a superposed signal with a largest energy value; and using a first angle corresponding to a superposed signal with a largest energy value in superposed signals at a first position as the first estimate.

18. The echo signal processing apparatus according to claim 17, wherein the operations further include:

constructing a second steering vector based on each preset angle and structural position information of an antenna array element of the echo signal processing apparatus, wherein the second steering vector comprises angle information in the first echo signals respectively received by the at least two receive antennas corresponding to the first target; and multiplying the signals corresponding to each position in the at least two first range-Doppler maps corresponding to the first transmit antenna by the second steering vector, to obtain the at least two compensated first range-Doppler maps corresponding to each preset angle.

19. The echo signal processing apparatus according to claim 12, wherein the operation of performing the coherent superposition on the at least two first range-Doppler maps corresponding to a transmit antenna, to obtain the third range-Doppler map corresponding to the transmit antenna comprises:

performing Fourier transform on signals at each position in the at least two first range-Doppler maps corresponding to the transmit antenna, to obtain the third range-Doppler map corresponding to the transmit antenna and a second angle corresponding to the signals at each position; and wherein the determining the first estimate of the direction of arrival formed by the receive antennas and the first target comprises:

using a second angle corresponding to signals at a first position as the first estimate.

20. The echo signal processing apparatus according to claim 12, wherein the operation of performing the velocity estimation based on the at least two first compensated echo signals in the M first compensated echo signals, to obtain the velocity of the first target comprises:

performing frequency estimation on the M first compensated echo signals to obtain a first Doppler frequency;

performing, by using the first Doppler frequency, Doppler compensation on K third echo signals received by each receive antenna in a same measurement dimension, to obtain K second compensated echo signals corresponding to each receive antenna in the same measurement dimension, wherein the K third echo signals are echo signals formed after transmit signals transmitted by K transmit antennas in the time division transmit mode are reflected by the first target, the K transmit antennas and the receive antenna belong to the same measurement dimension, and K is a positive integer less than N;

performing angle estimation based on the K second compensated echo signals to obtain a second estimate of the direction of arrival; and in response to an absolute value of a difference between the first estimate and the second estimate being less than or equal to a preset threshold, determining the velocity of the first target based on the first Doppler frequency.

* * * * *